US012720434B2

(12) United States Patent
Da Silva et al.

(10) Patent No.: US 12,720,434 B2
(45) Date of Patent: Aug. 25, 2026

(54) RADIO LINK MANAGEMENT FOR SECONDARY CELL GROUP IN POWER-SAVING MODE

(71) Applicant: Telefonaktiebolaget LM Ericsson (PUBL), Stockholm (SE)

(72) Inventors: Icaro L.J. Da Silva, Solna (SE); Muhammad Ali Kazmi, Sundbyberg (SE); Oumer Teyeb, Montréal (CA)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 610 days.

(21) Appl. No.: 18/040,038

(22) PCT Filed: Aug. 3, 2021

(86) PCT No.: PCT/SE2021/050766
§ 371 (c)(1),
(2) Date: Jan. 31, 2023

(87) PCT Pub. No.: WO2022/031205
PCT Pub. Date: Feb. 10, 2022

(65) Prior Publication Data
US 2023/0284145 A1 Sep. 7, 2023

Related U.S. Application Data

(60) Provisional application No. 63/060,217, filed on Aug. 3, 2020.

(51) Int. Cl.
*H04W 52/02* (2009.01)

(52) U.S. Cl.
CPC ................................ *H04W 52/0235* (2013.01)

(58) Field of Classification Search
CPC ......... H04W 52/0235; H04W 52/0229; H04W 76/15; Y02D 30/70
See application file for complete search history.

(56) References Cited

U.S. PATENT DOCUMENTS 9,042,315 B2 * 5/2015 Lin ........................ H04W 76/19 370/242
2014/0050113 A1 2/2014 Rosa et al.
(Continued)

FOREIGN PATENT DOCUMENTS

EP 3944670 A1 * 1/2022 ........ H04W 36/0058
WO WO-2020092498 A1 * 5/2020 ............. H04B 17/24

OTHER PUBLICATIONS

Jie Cui, Radio Link Monitoring (RLM) Evaluation Mechanism for New Radio (NR) Systems, Oct. 13, 2017, p. 2-4 and 34 (Year: 2017).*

(Continued)

*Primary Examiner* — Ian N Moore
*Assistant Examiner* — Latresa A Mccallum
(74) *Attorney, Agent, or Firm* — Baker Botts L.L.P.

(57) ABSTRACT

According to some embodiments, a method is performed by a wireless device (110) for power saving. The wireless device operates with a first cell group and a second cell group. The method comprises: receiving a command to transition the second cell group from a first mode of operation to a second mode of operation; transitioning the second cell group into the second mode of operation; modifying at least one parameter that was used for performing radio link monitoring, RLM, associated with the second cell group while the second cell group was in the first mode of operation; and performing RLM according to the at least one modified parameter while the second cell group is in the second mode of operation.

24 Claims, 13 Drawing Sheets

(56) References Cited

U.S. PATENT DOCUMENTS

| | | | | |
|---|---|---|---|---|
| 2018/0227156 | A1* | 8/2018 | Papasakellariou | H04L 27/2613 |
| 2019/0116564 | A1* | 4/2019 | Åström | H04B 7/10 |
| 2020/0037242 | A1* | 1/2020 | Yilmaz | H04W 52/0216 |
| 2021/0105077 | A1* | 4/2021 | Xu | H04L 5/0048 |
| 2021/0204344 | A1* | 7/2021 | Babaei | H04W 80/02 |
| 2021/0377852 | A1* | 12/2021 | Zhou | H04W 52/0235 |
| 2022/0022064 | A1* | 1/2022 | Raghavan | H04W 24/10 |
| 2022/0086710 | A1* | 3/2022 | Xu | H04W 36/305 |
| 2023/0014081 | A1* | 1/2023 | Cui | H04B 17/318 |

OTHER PUBLICATIONS

Alire Babaei, Cross-Carrier Scheduling, Jan. 1, 2020, p. 33 (Year: 2020).*

3GPP TS 38.213 V16.2.0 (Jun. 2020); 3rd Generation Partnership Project; Technical Specification Group Radio Access Network; NR; Physical layer procedures for control (Release 16).

3GPP TS 38.214 V16.2.0 (Jun. 2020); 3rd Generation Partnership Project; Technical Specification Group Radio Access Network; NR; Physical layer procedures for data (Release 16).

3GPP TS 38.321 V16.1.0 (Jul. 2020); 3rd Generation Partnership Project; Technical Specification Group Radio Access Network; NR; Medium Access Control (MAC) protocol specification (Release 16).

ETSI TS 138 331 v16.1.0 (Jul. 2020) 5G; NR; Radio Resource Control (RRC); Protocol specification (3GPP TS 38.331 version 16.1.0 Release 16).

3GPP TSG RAN WG2 Meeting #107; Prague, Czech; Source: Qualcomm Incorporated; Title: Introducing suspension of SCG (R2-1908679)—Aug. 26-30, 2019.

PCT International Search Report issued for International application No. PCT/SE2021/050766—Nov. 15, 2021.

PCT Written Opinion of the International Searching Authority issued for International application No. PCT/SE2021/050766—Nov. 15, 2021.

3GPP TSG RAN Meeting #84; Newport Beach; Source: China Telecom, Samsung; Title: New SI: Study on coverage enhancement for NR (RP-190xxxx)—Jun. 3-6, 2019.

3GPP TSG-RAN WG2 meeting #108; Source: ETSI MCC; Title: Report of 3GPP TSG RAN2#107bis meeting, Chongqing, China (R2-1914301)—Oct. 14-18, 2019.

3GPP TS 38.133 v16.4.0 (Jun. 2020) 3rd Generation Partnership Project; Technical Specification Group Radio Access Network; NR; Requirements for support of radio resource management (Release 16).

3GPP TS 36.133 v16.6.0 (Jun. 2020) 3rd Generation Partnership Project; Technical Specification Group Radio Access Network; Evolved Universal Terrestrial Radio Access (E-Utra); Requirements for support of radio resource management (Release 16).

* cited by examiner

RADIO LINK MANAGEMENT FOR SECONDARY CELL GROUP IN POWER-SAVING MODE

PRIORITY

This nonprovisional application is a U.S. National Stage Filing under 35 U.S.C. § 371 of International Patent Application Serial No. PCT/SE2021/050766 filed Aug. 3, 2021 and entitled "RLM FOR SCG IN POWER-SAVING MODE" which claims priority to U.S. Provisional Patent Application No. 63/060,217 filed Aug. 3, 2020, both of which are hereby incorporated by reference in their entirety.

TECHNICAL FIELD

Embodiments of the present disclosure are directed to wireless communications and, more particularly, to radio link monitoring (RLM) for a secondary cell group (SCG) in power saving mode.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Fifth generation (5G) wireless networks include radio link monitoring (RLM) features. For new radio (NR) normal mode of operation, a radio link failure (RLF) triggered by physical layer problems occurs when a configured timer T310 expires. The T310 timer starts when a counter handled by radio resource control (RRC) (counter N310) reaches its maximum value. The counter is incremented based on indications transmitted by L1. The counter value is either configured in system information or via dedicated signaling. In RRC the detection is described as follows:

For detection of physical layer problems in RRC_CONNECTED state, the user equipment (UE) shall, upon receiving N310 consecutive "out-of-sync" indications for the SpCell from lower layers while neither T300, T301, T304, T311 nor T319 are running, start timer T310 for the corresponding SpCell.

FIG. 1 is a timing diagram illustrating the relation between the counter N310 and the start of timer T310, and other procedures when the timer expires (declaration of RLF). FIG. 1 applies to long term evolution (LTE), but the procedure is similar for NR radio link monitoring (RLM)):

For both LTE and NR, the purpose of the RLM function in the UE is to monitor the downlink radio link quality of the serving cell in RRC_CONNECTED state (SpCell in NR terminology). In the LTE case, RLM is based on measurements performed on cell-specific reference signals (CRS), which are associated to a given LTE cell and derived from the physical cell identifier (PCI). This in turn enables the UE when in RRC_CONNECTED state to determine whether it is in-sync (IS) or out-of-sync (OOS) with respect to its SpCell.

The UE's estimate of the downlink radio link quality is compared with out-of-sync and in-sync thresholds, Qout and Qin respectively, for the purpose of RLM. These thresholds are expressed in terms of the block error rate (BLER) of a hypothetical physical downlink control channel (PDCCH) transmission from the serving cell. Specifically, Qout corresponds to a 10% BLER while Qin corresponds to a 2% BLER. The same threshold levels are applicable with and without discontinuous reception (DRX).

The mapping between the CRS based downlink quality (a signal to interference plus noise ratio (SINR)) and the hypothetical PDCCH BLER is up to the UE implementation. However, the performance is verified by conformance tests defined for various environments. Also, the downlink quality is calculated based on the reference signal receive power (RSRP) of CRS over the entire band because in LTE, the PDCCH is scheduled over the entire band, as illustrated in FIG. 2.

FIG. 2 is a time and frequency diagram illustrating PDCCH in a radio frame. The horizontal axis represents time and the vertical axis represents frequency. The PDCCH is illustrated in the first four symbols of the first subframe.

In NR, RLM is also defined for a similar purpose as in LTE. i.e., monitor the downlink radio link quality of the SpCell in RRC_CONNECTED state. However, different from LTE, a level of configurability is included for RLM in NR in terms of reference signal (RS) type/beam/RLM resource configuration and BLER thresholds for IS/OOS generation.

In NR, two different RS types (SSBs and CSI-RSs) are defined for RRM (Radio Resource Management) measurements for mobility assistance, RLM, beam failure detection, etc. There are different reasons to define the two RS types. One reason is the possibility to transmit SSBs in wide beams and transmit CSI-RSs in narrow beams, and the other reason is the ability to change the beamformer of CSI-RS dynamically without affecting the idle mode coverage of the cell (which would have changed if SSB beamformer is changed).

In NR, the RS type used for RLM is also configurable (both CSI-RS based RLM and SS-block based RLM are supported) and the RS type for RLM may be configured via RRC signaling. Because NR can operate in quite high frequencies (above 6 GHs, but up to 100 GHz) the RS types used for RLM can be beamformed. In other words, depending on deployment or operating frequency, the UE can be configured to monitor beamformed reference signals regardless which RS type is selected for RLM. Thus, different from LTE, RS for RLM can be transmitted in multiple beams.

Because there can be multiple beams, the UE needs to know which ones to monitor for RLM and how to generate IS/OOS events to be indicated to upper layers (so upper layers are able to control the triggering of RLF). In the case of SSB, each beam can be identified by an SSB index (derived from a time index in PBCH and/or a PBCH/DRMS scrambling), while in case of CSI-RS, a resource index is also defined (signaled with the CSI-RS configuration). In NR, the network can configure, by RRC signaling, X RLM resources to be monitored, either related to SS blocks or CSI-RS. The RLM resources may be configured according to any of the following.

For example, one RLM-RS resource can be either one SS/PBCH block or one CSI-RS resource/port. The RLM-RS resources may be UE-specifically configured. When a UE is configured to perform RLM on one or multiple RLM-RS resource(s), periodic IS is indicated if the estimated link quality corresponding to hypothetical PDCCH BLER based on at least one RLM-RS resource among all configured X RLM-RS resource(s) is above Q_in threshold. Periodic OOS is indicated if the estimated link quality corresponding to hypothetical PDCCH BLER based on all configured X RLM-RS resource(s) is below Q_out threshold. This points in the direction that only the quality of best beam really matters at every sample to generate OOS/IS events. In other words, if the best beam is below the threshold (i.e., all others would also be), then an OOS event is generated. Same for IS event, as long as the best is above (all other do not matter).

The RLM configuration is provided in RadioLinkMonitoringConfig, which is provided per bandwidth part (BWP), e.g., at the initial downlink BWP as part of the ServingCellConfig for an SpCell (i.e., in SpCellconfig), as a dedicated BWP (BWP-DownlinkDedicated) to be used when the UE is in RRC_CONNECTED, configured as follows:

RadioLinkMonitoringConfig information element

```
---- ASN1START
-- TAG-RADIOLINKMONITORINGCONFIG-START
RadioLinkMonitoringConfig ::=              SEQUENCE {
   failureDetectionResourcesToAddModList                SEQUENCE
(SIZE(1..maxNrofFailureDetectionResources) )            OF RadioLinkMonitoringRS
OPTIONAL, -- Need N
   failureDetectionResourcesToReleaseList               SEQUENCE
(SIZE(1. .maxNrofFailureDetectionResources) )           OF RadioLinkMonitoringRS-Id
OPTIONAL, -- Need N
   beamFailureInstanceMaxCount                          ENUMERATED {n1, n2, n3, n4, n5,
n6, n8, n10} OPTIONAL, -- Need R
   beamFailureDetectionTimer                            ENUMERATED {pbfd1, pbfd2,
pbfd3, pbfd4, pbfd5, pbfd6, pbfd8, pbfd10}              OPTIONAL, -- Need R
   ...
}
RadioLinkMonitoringRS ::=                SEQUENCE {
   radioLinkMonitoringRS-Id                        RadioLinkMonitoringRS-Id,
   purpose                                         ENUMERATED {beamFailure, rlf,
both} ,
   detectionResource                               CHOICE {
      ssb-Index                                         SSB-Index,
      csi-RS-Index                                      NZP-CSI-RS-ResourceId
   },
   ...
}
-- TAG-RADIOLINKMONITORINGCONFIG-STOP
-- ASN1STOP
```

| RadioLinkMonitoringConfig field descriptions |
|---|
| beamFailureDetectionTimer<br>Timer for beam failure detection (see TS 38.321, clause 5.17). See also the BeamFailureRecoveryConfig IE. Value in number of "$Q_{out,LR}$ reporting periods of Beam Failure Detection" Reference Signal (see TS 38.213, clause 6). Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on. |
| beamFailureInstanceMaxCount<br>This field determines after how many beam failure events the UE triggers beam failure recovery (see TS 38.321, clause 5.17). Value n1 corresponds to 1 beam failure instance, value n2 corresponds to 2 beam failure instances and so on. |
| failureDetectionResourcesToAddModList<br>A list of reference signals for detecting beam failure and/or cell level radio link failure (RLF). The limits of the reference signals that the network can configure are specified in TS 38.213, table 5-1. The network configures at most two detectionResources per BWP for the purpose beamFailure or both. If no RSs are provided for the purpose of beam failure detection, the UE performs beam monitoring based on the activated TCI-State for PDCCH as described in TS 38.213, clause 6. If no RSs are provided in this list for the purpose of RLF detection, the UE performs Cell-RLM based on the activated TCI-State of PDCCH as described in TS 38.213, clause 5. The network ensures that the UE has a suitable set of reference signals for performing cell-RLM. |

The UE needs to know which resources to monitor, but also how to generate IS/OOS events to be reported internally to higher layers. While in LTE the SINR maps to a 10% BLER for the generation of OOS events and the SINR maps to a BLER of 2% for the generation of IS events, configurable values can be defined in NR. Currently, LTE-like 10% and 2% BLER can be configured for OOS and IS events and another pair of X % and Y % may be standardized after a ultra-reliable low latency communications (URLLC) type of application related requirements are defined. Thus, differently from LTE, the BLER thresholds for IS/OOS generation are configurable.

Another alternative in the specifications is when the UE is not configured with an RLM configuration and the UE relies on the transmission configuration indicator (TCI) state framework as described in TS 38.213 and summarized as follows. If the UE is not provided RadioLinkMonitoringRS and the UE is provided for PDCCH receptions TCI states that include one or more of a CSI-RS, then the UE uses for radio link monitoring the RS provided for the active TCI state for PDCCH reception if the active TCI state for PDCCH reception includes only one RS. If the active TCI state for PDCCH reception includes two RS, the UE expects that one RS has QCL-TypeD [TS 38.214] and the UE uses the RS with QCL-TypeD for radio link monitoring. The UE does not expect both RS to have QCL-TypeD.

The UE is not required to use for radio link monitoring an aperiodic or semi-persistent RS. For $L_{max}$, the UE selects the $N_{RLM}$ RS provided for active TCI states for PDCCH receptions in CORESETs associated with the search space sets in an order from the shortest monitoring periodicity. If more than one CORESETs are associated with search space sets having the same monitoring periodicity, the UE determines the order of the CORESET from the highest CORESET index as described in Subclause 10.1.

According to TS 38.133, requirements for RLM apply for radio link monitoring on configured SpCell(s), i.e., PCell in SA NR, NR-DC and NE-DC operation mode, and PSCell in NR-DC and EN-DC operation mode.

The UE shall monitor the downlink radio link quality based on the reference signal configured as RLM-RS resource(s) to detect the downlink radio link quality of the PCell and PSCell as specified in TS 38.213. The configured RLM-RS resources can be all SSBs, or all CSI-RSs, or a mix of SSBs and CSI-RSs. A UE is not required to perform RLM outside the active downlink BWP.

On each RLM-RS resource, a UE shall estimate the downlink radio link quality and compare it to the thresholds $Q_{out}$ and $Q_{in}$ for the purpose of monitoring downlink radio link quality of the cell.

The threshold $Q_{out}$ is defined as the level at which the downlink radio link cannot be reliably received and shall correspond to the out-of-sync block error rate ($BLER_{out}$ t) as defined in Table 8.1.1-1. For SSB based radio link monitoring, $Q_{out\_SSB}$ is derived based on the hypothetical PDCCH transmission parameters listed in Table 8.1.2.1-1. For CSI-RS based radio link monitoring, $Q_{out\_CSI\text{-}RS}$ is derived based on the hypothetical PDCCH transmission parameters listed in Table 8.1.3.1-1.

The threshold $Q_{in}$ is defined as the level at which the downlink radio link quality can be received with significantly higher reliability than at $Q_{out}$ and shall correspond to the in-sync block error rate ($BLER_{in}$) as defined in Table 8.1.1-1. For SSB based radio link monitoring, $Q_{in\_SSB}$ is derived based on the hypothetical PDCCH transmission parameters listed in Table 8.1.2.1-2. For CSI-RS based radio link monitoring, $Q_{in\_CSI\text{-}RS}$ is derived based on the hypothetical PDCCH transmission parameters listed in Table 8.1.3.1-2.

The out-of-sync block error rate ($BLER_{out}$) and in-sync block error rate ($BLER_{in}$) are determined from the network configuration via parameter rlmInSyncOutOfSyncThreshold signalled by higher layers.

When a UE is not configured with rlminSyncOutOfSyncThreshold from the network, the UE determines out-of-sync and in-sync block error rates from Configuration #0 in Table 8.1.1-1 by default. All requirements in clause 8.1 are applicable for BLER Configuration #0 in Table 8.1.1-1.

TABLE 8.1.1-1

Out-of-sync and in-sync block error rates

| Configuration | $BLER_{out}$ | $BLER_{in}$ |
|---|---|---|
| 0 | 10% | 2% |

A UE shall be able to monitor up to $N_{RLM}$ RLM-RS resources of the same or different types in each corresponding carrier frequency range, depending on a maximum number $L_{max}$ of SSBs per half frame according to TS 38.213, where $N_{RLM}$ is specified in Table 8.1.1-2, and meet the requirements as specified in clause 8.1. UE is not required to meet the requirements in clause 8.1 if RLM-RS is not configured and no TCI state for PDCCH is activated.

TABLE 8.1.1-2

Maximum number of RLM-RS resources $N_{RLM}$

| Carrier frequency range of PCell/PSCell | | Maximum number of RLM-RS resources, $N_{RLM}$ |
|---|---|---|
| FR1, ≤3 GHZ[Note] | 4 | 2 |
| FR1, >3 GHZ[Note] | 8 | 4 |
| FR2 | 64 | 8 |

Note:
For unpaired spectrum operation with Case C - 30 kHz SCS, 3 GHz is replaced by 2.4 GHz, as specified in clause 4.1 in TS 38.213.

Requirements for SSB based radio link monitoring are described below. The requirements below apply for each SSB based RLM-RS resource configured for PCell or PSCell, provided that the SSB configured for RLM is actually transmitted within the UE active downlink BWP during the entire evaluation period.

TABLE 8.1.2.1-1

PDCCH transmission parameters for out-of-sync evaluation

| Attribute | Value for BLER Configuration #0 |
|---|---|
| DCI format | 1-0 |
| Number of control OFDM symbols | 2 |
| Aggregation level (CCE) | 8 |
| Ratio of hypothetical PDCCH RE energy to average SSS RE energy | 4 dB |
| Ratio of hypothetical PDCCH DMRS energy to average SSS RE energy | 4 dB |
| Bandwidth (PRBs) | 24 |
| Sub-carrier spacing (kHz) | SCS of the active DL BWP |
| DMRS precoder granularity | REG bundle size |
| REG bundle size | 6 |
| CP length | Normal |
| Mapping from REG to CCE | Distributed |

TABLE 8.1.2.1-2

PDCCH transmission parameters for in-sync evaluation

| Attribute | Value for BLER Configuration #0 |
|---|---|
| DCI payload size | 1-0 |
| Number of control OFDM symbols | 2 |
| Aggregation level (CCE) | 4 |
| Ratio of hypothetical PDCCH RE energy to average SSS RE energy | 0 dB |
| Ratio of hypothetical PDCCH DMRS energy to average SSS RE energy | 0 dB |
| Bandwidth (PRBs) | 24 |
| Sub-carrier spacing (kHz) | SCS of the active DL BWP |
| DMRS precoder granularity | REG bundle size |

TABLE 8.1.2.1-2-continued

| PDCCH transmission parameters for in-sync evaluation | |
|---|---|
| Attribute | Value for BLER Configuration #0 |
| REG bundle size | 6 |
| CP length | Normal |
| Mapping from REG to CCE | Distributed |

A UE shall be able to evaluate whether the downlink radio link quality on the configured RLM-RS resource estimated over the last $T_{Evaluate\_out\_SSB}$ [ms] period becomes worse than the threshold $Q_{out\_SSB}$ within $T_{Evaluate\_out\_SSB}$ [ms] evaluation period.

A UE shall be able to evaluate whether the downlink radio link quality on the configured RLM-RS resource estimated over the last $T_{Evaluate\_in\_SSB}$ [ms] period becomes better than the threshold $Q_{in\_SSB}$ within $T_{Evaluate\_in\_SSB}$ [ms] evaluation period.

$T_{Evaluate\_out\_SSB}$ and $T_{Evaluate\_in\_SSB}$ are defined in the table below for FR1.

| Evaluation period $T_{Evaluate\_out\_SSB}$ and $T_{Evaluate\_in\_SSB}$ for FR1 | | |
|---|---|---|
| Configuration | $T_{Evaluate\_out\_SSB}$ (ms) | $T_{Evaluate\_in\_SSB}$ (ms) |
| no DRX | Max(200, Ceil(10 □ P) □ $T_{SSB}$) | Max(100, Ceil(5 □ P) □ $T_{SSB}$) |
| DRX cycle ≤320 ms | Max(200, Ceil(15 □ P) □ Max($T_{DRX}$, $T_{SSB}$)) | Max(100, Ceil(7.5 □ P) □ Max($T_{DRX}$, $T_{SSB}$)) |
| DRX cycle >320 ms | Ceil(10 □ P) □ $T_{DRX}$ | Ceil(5 □ P) □ $T_{DRX}$ |

NOTE:
$T_{SSB}$ is the periodicity of the SSB configured for RLM. $T_{DRX}$ is the DRX cycle length.

For FR1, $$P = \frac{1}{1 - \frac{T_{SSB}}{MRGP}},$$

when in the monitored cell there are measurement gaps configured for intra-frequency, inter-frequency or inter-RAT measurements, and these measurement gaps are overlapping with some but not all occasions of the SSB; and P=1 when in the monitored cell there are no measurement gaps overlapping with any occasion of the SSB.

For example, assuming an SpCell whose SSB periodicity ($T_{SSB}$) equals 20 ms, Max (200, Ceil(10×1)×20 ms)=200 ms, which would be the evaluation period for RLM. On the other hand, if SSB are transmitted with longer periodicities (e.g., 40 ms), Max (200, Ceil(10×1)×40 ms)=400 ms, i.e., a longer evaluation period could be considered.

$T_{Evaluate\_out\_SSB}$ and $T_{Evaluate\_in\_SSB}$ are defined for FR2 with scaling factor N=8, as shown below:

TABLE 8.1.2.2-2

| Evaluation period $T_{Evaluate\_out\_SSB}$ and $T_{Evaluate\_in\_SSB}$ for FR2 | | |
|---|---|---|
| Configuration | $T_{Evaluate\_out\_SSB}$ (ms) | $T_{Evaluate\_in\_SSB}$ (ms) |
| no DRX | Max(200, Ceil(10 □ P □ N) □ $T_{SSB}$) | Max(100, Ceil(5 □ P □ N) □ $T_{SSB}$) |
| DRX cycle ≤320 ms | Max(200, Ceil(15 □ P □ N) □ Max($T_{DRX}$, $T_{SSB}$)) | Max(100, Ceil(7.5 □ P □ N) □ Max($T_{DRX}$, $T_{SSB}$)) |
| DRX cycle >320 ms | Ceil(10 □ P □ N) □ $T_{DRX}$ | Ceil(5 □ P □ N) □ $T_{DRX}$ |

NOTE:
$T_{SSB}$ is the periodicity of the SSB configured for RLM. $T_{DRX}$ is the DRX cycle length.

For FR2, $$P = \frac{1}{1 - \frac{T_{SSB}}{T_{SMTCperiod}}},$$

when RLM-RS resource is not overlapped with measurement gap and the RLM-RS resource is partially overlapped with SMTC occasion ($T_{SSB}<T_{SMTCperiod}$). P is $P_{sharingfactor}$, when the RLM-RS resource is not overlapped with measurement gap and RLM-RS resource is fully overlapped with SMTC period ($T_{SSB}=T_{SMTCperiod}$).

$$P = \frac{1}{1 - \frac{T_{SSB}}{MRGP} - \frac{T_{SSB}}{T_{SMTCperiod}}},$$

when the RLM-RS resource is partially overlapped with measurement gap and the RLM-RS resource is partially overlapped with SMTC occasion ($T_{SSB}<T_{SMTCperiod}$) and SMTC occasion is not overlapped with measurement gap and $T_{SMTCperiod} \neq MGRP$ or $T_{SMTCperiod}=MGRP$ and $T_{SSB}<0.5*T_{SMTCperiod}$.

$$P = \frac{P_{sharing\,factor}}{1 - \frac{T_{SSB}}{MRGP}},$$

when the RLM-RS is partially overlapped with measurement gap and the RLM-RS is partially overlapped with SMTC occasion ($T_{SSB}<T_{SMTCperiod}$) and SMTC occasion is not overlapped with measurement gap and $T_{SMTCperiod}=MGRP$ and $T_{SSB}=0.5\times T_{SMTCperiod}$.

$$P = \frac{1}{1 - \frac{T_{SSB}}{\mathrm{Min}(MRGP,\ T_{SMTCperiod})}},$$

when the RLM-RS resource is partially overlapped with measurement gap and the RLM-RS resource is partially overlapped with SMTC occasion ($T_{SSB}<T_{SMTCperiod}$) and SMTC occasion is partially or fully overlapped with measurement gap.

$$P = \frac{P_{sharing\,factor}}{1 - \frac{T_{SSB}}{MRGP}},$$

when the RLM-RS resource is partially overlapped with measurement gap and the RLM-RS resource is fully overlapped with SMTC occasion ($T_{SSB}=T_{SMTCperiod}$) and SMTC occasion is partially overlapped with measurement gap ($T_{SMTCperiod}<$MGRP).

$P_{sharing\ factor}=1$, if the RLM-RS resource outside measurement gap is not overlapped with the SSB symbols indicated by SSB-ToMeasure and 1 data symbol before each consecutive SSB symbols indicated by SSB-ToMeasure and 1 data symbol after each consecutive SSB symbols indicated by SSB-ToMeasure, given that SSB-ToMeasure is configured, and, not overlapped by the RSSI symbols indicated by ss-RSSI-Measurement and 1 data symbol before each RSSI symbol indicated by ss-RSSI-Measurement and 1 data symbol after each RSSI symbol indicated by ss-RSSI-Measurement, given that ss-RSSI-Measurement is configured. $P_{sharingfactor}=3$, otherwise.

If the high layer in TS 38.331 signaling of smtc2 is present, $T_{SMTCperiod}$ follows smtc2. Otherwise $T_{SMTCperiod}$ follows smtc1. $T_{SMTCperiod}$ is the shortest SMTC period among all CCs in the same FR2 band, provided the SMTC offset of all CCs in FR2 have the same offset. If the high layer in TS 38.331 signaling of smtc2 is present, $T_{SMTCperiod}$ follows smtc2. Otherwise $T_{SMTCperiod}$ follows Smtc1.

Longer evaluation period may be expected if the combination of RLM-RS resource, SMTC occasion and measurement gap configurations does not meet previous conditions.

A set of requirements somewhat equivalent to the ones described herein are also defined for CSI-RS based RLM, i.e., when CSI-RS resources are configured as RLM-RS resources, in TS 38.133 (see 8.1.3).

The UE uses measurement gaps to perform measurements when it cannot measure the target carrier frequency while simultaneously transmitting/receiving on the serving cell.

In the case of LTE, the UE uses measurement gaps to perform inter-frequency and inter-RAT measurements. A measurement gap is defined by the gap length and periodicity. In LTE, the typical gap length is 6 ms (which is actually equivalent to a 5 ms measurement time, assuming RF re-tuning time of 0.5 ms before and after the measurement gap). This is sufficient in LTE as the PSS and SSS are transmitted once every 5 ms. The measurement gap periodicity can be either 40 ms or 80 ms.

In NR, measurements gaps might be required for intra-frequency (e.g., if the intra-frequency measurements are to be done outside of the active BWP), inter-frequency and inter-RAT measurements. Measurement gap lengths of 1.5, 3, 3.5, 4, 5.5, and 6 ms with measurement gap repetition periodicities of 20, 40, 80, and 160 ms are defined in NR.

In NR, the RF re-tuning time is 0.5 ms for carrier frequency measurements in FR1 range and 0.25 ms for FR2 range. For example, a gap length of 4 ms for FR1 measurements allows 3 ms for actual measurements and a gap length of 3.5 ms for FR2 measurements allows 3 ms for actual measurements.

During the measurement gaps, the measurements are to be performed on SSBs of the neighbor cells. The network provides the timing of neighbor cell SSBs using SS/PBCH Block Measurement Timing Configuration (SMTC).

The measurement gap and SMTC duration are configured such that the UE can identify and measure the SSBs within the SMTC window, i.e., the SMTC duration should be sufficient enough to accommodate all SSBs that are being transmitted.

For SSB based intra-frequency measurements, the network always configures a measurement gap when any of the UE configured BWPs do not contain the frequency domain resources of the SSB associated to the initial downlink BWP.

For SSB based inter-frequency measurements, the network always configures a measurement gap in the following cases: (a) if the UE supports per-FR measurement gaps (i.e., separate RF chains for FR1 and FR2, meaning performing measurements on the gap interrupts the Tx/Rx on the corresponding frequency range, FR) and if the carrier frequency to be measured is in same FR as any of the serving cells; and (b) if the UE only supports per-UE measurement gaps (i.e., common RF chain for FR1 and FR2, meaning performing measurements interrupts tx/rx on both frequency ranges). In this case, the measurement object can be configured on any frequency range (FR1 or FR2) but the gap will anyway be configured by the network.

Inter-RAT measurements in NR are limited to E-UTRA. For a UE configured with E-UTRA inter-RAT measurements, a measurement gap configuration is always provided when: the UE only supports per-UE measurement gaps; or the UE supports per-FR measurement gaps and at least one of the NR serving cells is in FR1.

NR may include SCG power saving mode. To improve network energy efficiency and UE battery life for UEs in MR-DC, NR may include efficient SCG/SCell activation/deactivation features. This can be especially important for MR-DC configurations with NR SCG, where in some cases NR UE power consumption is 3 to 4 times higher than LTE.

3GPP has specified the concepts of dormant SCell (in LTE) and dormancy like behavior of an SCell (for NR).

In LTE, when an SCell is in dormant state, like in the deactivated state, the UE does not need to monitor the corresponding PDCCH or PDSCH and cannot transmit in the corresponding uplink. However, differently from deactivated state, the UE is required to perform and report CQI measurements. A PUCCH SCell (SCell configured with PUCCH) cannot be in dormant state.

In NR, dormancy like behavior for SCells is realized using the concept of dormant BWPs. One dormant BWP, which is one of the dedicated BWPs configured by the network via RRC signaling, can be configured for an SCell. If the active BWP of the activated SCell is a dormant BWP, the UE stops monitoring PDCCH on the SCell but continues performing CSI measurements, AGC and beam management, if configured. A DCI is used to control entering/leaving the dormant BWP for one or more SCell(s) or one or more SCell group(s), and it is sent to the special cell (sPCell) of the cell group that the SCell belongs to (i.e., PCell in case the SCell belongs to the MCG and PSCell if the SCell belongs to the SCG). The SpCell (i.e., PCell of PSCell) and PUCCH SCell cannot be configured with a dormant BWP.

FIG. 3 is a state machine illustrating dormancy-like behavior for SCells in NR. The activated SCell transitions between a dormant BWP and a BWP.

However, only SCells can be put to put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution may be releasing (for power savings) and adding (when traffic demands requires) the SCG on a need basis. However, traffic is likely to be bursty, and adding and releasing the SCG involves a significant amount of RRC signaling and inter-node messaging between the MN and the SN, which causes considerable delay.

Another potential option is to put the PSCell in dormancy, also referred to as SCG Suspension. Some attributes of SCG Suspension include the following. The UE supports network-controlled suspension of the SCG in RRC_CONNECTED. The UE supports at most one SCG configuration, suspended or not suspended. In RRC_CONNECTED, upon addition of the SCG, the SCG can be either suspended or not suspended by configuration.

Other proposed solutions have different problems. For example, one option is that the gNB can indicate to the UE to suspend SCG transmissions when no data traffic is expected to be sent in SCG so that the UE keeps the SCG configuration but does not use it for power saving purpose. Signaling to suspend SCG may be based on DCI/MAC-CE/RRC signaling, but no details are given regarding the configuration from the gNB to the UE. And, different from the defined behavior for SCell(s), PSCell may be associated to a different network node (e.g., a gNodeB operating as Secondary Node).

SCG power saving for NR may include one or more of the following options.

- The UE starting to operate the PSCell in dormancy, e.g., switching the PSCell to a dormant BWP. On the network side, the network considers the PSCell in dormancy and at least stops transmitting PDCCH for that UE in the PSCell and SCells.
- The UE deactivating the PSCell like SCell deactivation. On the network side, the network considers the PSCell as deactivated and at least stops transmitting PDCCH for that UE in the PSCell (and also on the SCells).
- The UE operating the PSCell in long DRX; SCG DRX can be switched off from the MN (e.g., via MCG RRC, MAC CE or DCI) when the need arises (e.g., downlink data arrival for SN terminated SCG bearers).
- The UE suspending its operation with the SCG (e.g., suspending bearers associated with the SCG, like SCG MN-/SN-terminated bearers), but keeping the SCG configuration stored (referred to as Stored SCG). On the network side there can be different alternatives such as the SN storing the SCG as the UE does, or the SN releasing the SCG context of the UE to be generated again upon resume (e.g., with the support from the MN that is the node storing the SCG context for that UE whose SCG is suspended).

Though the power saving aspect is so far described from the SCG point of view, similar approaches may be used on the MCG as well (e.g., the MCG may be suspended or in long DRX, while data communication is happening only via the SCG).

Below are the RLM/RLF related timers, constants, and configurations from 38.331 v g.0.0. RLF-TimersAndConstants (dedicated configuration, optionally included in CellGroupConfig, for the PCell or PSCell, depending if the corresponding cell group is the MCG or SCG, respectively).

The IE RLF-TimersAndConstants is used to configure UE specific timers and constants.

RLF-TimersAndConstants information element

```
-- ASN1START
-- TAG-RLF-TIMERSANDCONSTANTS-START
RLF-TimersAndConstants ::=          SEQUENCE {
  t310                                ENUMERATED {ms0, ms50, ms100,
ms200, ms500, ms1000, ms2000, ms4000, ms6000},
  n310                                ENUMERATED {n1, n2, n3, n4, n6, n8,
n10, n20},
  n311                                ENUMERATED {n1, n2, n3, n4, n5, n6,
n8, n10},
  ...,
  [[
  t311                                ENUMERATED {ms1000, ms3000, ms5000,
ms10000, ms15000, ms20000, ms30000}
  ]]
}
-- TAG-RLF-TIMERSANDCONSTANTS-STOP
-- ASN1STOP
```

UE-TimersAndConstants (broadcasted in SIB1 of PCell/PSCell, used by UEs if no dedicated info is provided via RLF-TimersAndConstants included in cell group config)

The IE UE-TimersAndConstants contains timers and constants used by the UE in RRC_CONNECTED, RRC_INACTIVE and RRC_IDLE.

UE-TimersAndConstants information element

```
-- ASN1START
-- TAG-UE-TIMERSANDCONSTANTS-START
UE-TimersAndConstants ::=           SEQUENCE {
  t300                                  ENUMERATED {ms100, ms200, ms300,
ms400, ms600, ms1000, ms1500, ms2000},
```

-continued

```
UE-TimersAndConstants information element

  t301                                      ENUMERATED {ms100, ms200, ms300,
ms400, ms600, ms1000, ms1500, ms2000},
  t310                                      ENUMERATED {ms0, ms50, ms100,
ms200, ms500, ms1000, ms2000},
  n310                                      ENUMERATED {n1, n2, n3, n4, n6, n8,
n10, n20},
  t311                                      ENUMERATED {ms1000, ms3000, ms5000,
ms10000, ms15000, ms20000, ms30000},
  n311                                      ENUMERATED {n1, n2, n3, n4, n5, n6,
n8, n10},
  t319                                      ENUMERATED {ms100, ms200, ms300,
ms400, ms600, ms1000, ms1500, ms2000},
  ...
}
-- TAG-UE-TIMERSANDCONSTANTS-STOP
-- ASN1STOP
```

| RLF-TimersAndConstants field descriptions |
|---|
| n3xy<br>Constants are described in clause 7.3. Value n1 corresponds to 1, value n2 corresponds to 2 and so on. |
| t3xy<br>Timers are described in clause 7.1. Value ms0 corresponds to 0 ms, value ms50 corresponds to 50 ms and so on. |

| Timer | Start | Stop | At expiry |
|---|---|---|---|
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, and upon initiating the MCG failure information procedure.<br>Upon SCG release, if the T310 is kept in SCG. | If the T310 is kept in MCG: If AS security is not activated: go to RRC_IDLE else: initiate the MCG failure information procedure as specified in 5.7.3b or the connection re-establishment procedure as specified in 5.3.7 or the procedure as specified in 5.3.10.3 if any DAPS bearer is configured.<br>If the T310 is kept in SCG, Inform E-UTRAN/NR about the SCG radio link failure by initiating the SCG failure information procedure as specified in 5.7.3. |

When the UE applies zero value for a timer, the timer shall be started and immediately expire unless explicitly stated otherwise.

| Counter | Reset | Incremented | When reaching max value |
|---|---|---|---|
| N310 | Upon reception of "in-sync" indication from lower layers; upon receiving RRCReconfiguration with reconfigurationWith Sync for that cell group; upon initiating the connection re-establishment procedure. | Upon reception of "out-of-sync" from lower layer while the timer T310 is stopped. | Start timer T310 |

-continued

| Counter | Reset | Incremented | When reaching max value |
|---|---|---|---|
| N311 | Upon reception of "out-of-sync" indication from lower layers; upon receiving RRCReconfiguration with reconfigurationWith Sync for that cell group; upon initiating the connection re-establishment procedure. | Upon reception of the "in-sync" from lower layer while the timer T310 is running. | Stop the timer T310. |

| Constant | Usage |
|---|---|
| N310 | Maximum number of consecutive "out-of-sync" indications for the SpCell received from lower layers |
| N311 | Maximum number of consecutive "in-sync" indications for the SpCell received from lower layers |

There currently exist certain challenges. For example, in dual connectivity the UE can perform uplink/downlink transmissions/receptions towards a master node (MN) and/or secondary node (SN) (for data transmission/reception using the associated MCG and/or SCG radio links). In typical scenarios, the MCG can be considered to offer basic coverage and the SCG used to increase the data rate during data bursts. The UE needs to continuously monitor the PDCCH for uplink and downlink scheduling assignments at least on the PCell and the PSCell, and potentially all other SCells if cross carrier scheduling is not employed. Even if cross carrier scheduling is employed, the UE has to perform extra PDCCH monitoring on the PCell or the PSCell for the sake of the SCell, depending on whether the SCell belongs to the MCG or the SCG.

As described above, there are several alternatives to put the SCG in power saving mode. One option is that the gNB can indicate to the UE to suspend SCG transmissions when no data traffic is expected to be sent in SCG so that UE keeps the SCG configuration but does not use it for power saving purpose. Concerning radio link monitoring behavior, the UE should perform RLM for the PSCell, to be able to declare S-RLF while SCG is suspended, so that the MN can release the SCG upon reception of S-RLF indication.

A problem is that while the SCG is in power saving mode, performing RLM on the PSCell just like in normal MR-DC operating mode may lead to significant power consumption at the UE and may offset the overall advantages of the power saving mode.

In addition, performing RLM on the PSCell as in normal mode of operation (i.e., UE operating in MR-DC as in Rel-16) may degrade the UE's throughput after being suspended (of the usage of MCG resources) because the UE may require to be configured with measurement gaps or needs to rely on autonomous gaps (e.g., to perform the RLM measurements on frequencies or frequency ranges that are different from the frequencies of frequency range used for the MCG serving cells).

SUMMARY

Based on the description above, certain challenges currently exist with radio link monitoring (RLM) for a secondary cell group (SCG) in power saving mode. Certain aspects of the present disclosure and their embodiments may provide solutions to these or other challenges. For example, particular embodiments include a wireless terminal (also referred to as a user equipment (UE)) configured with multi-radio dual connectivity (MR-DC), i.e., being configured with a first cell group (e.g., master cell group (MCG)) and a second cell group (e.g., secondary cell group (SCG)). The wireless terminal receives a command to transition the second cell group from a first mode of operation to a second mode of operation.

In one example, the first mode of operation is a normal operating mode and the second mode of operation is a power saving mode. In another example, the first mode of operation is a power saving mode and the second mode of operation is a normal operating mode.

The wireless terminal transitions the second cell group to the second mode of operation and modifies at least one parameter or requirement (e.g., periodicity, sampling rate, gaps, etc.) that were used for performing RLM associated with the second cell group while the second cell group was in the first mode of operation. The wireless terminal performs RLM according to the modified parameters/requirements while the second cell group is in the second mode of operation.

In some embodiments, when the UE is in MR-DC having a PCell and PSCell (and possibly MCG SCells and SCG SCells) and receives a command to enter (transition) the SCG to a power saving mode, the UE performs RLM according to a set of parameters and requirements wherein at least one of the parameters or requirements differs from the ones used in normal mode of operation for the PSCell. For example, the at least one difference may be more relaxed requirements for S-RLM when the SCG is in a power saving mode.

In some embodiments, while the SCG is in a power saving mode, the UE performs the monitoring for detecting radio link problems (e.g., RLF due to physical layer out of sync problems) according a set of parameters (e.g., T310, N310, N311, etc.) wherein at least one differs from the set of parameters used in normal mode of operation for the PSCell.

When changing requirements upon transition to a mode of operation, the UE may translate that in the change of parameters used and/or the manner in which the measurement performance is implemented.

According to some embodiments, a method is performed by a wireless device for power saving. The wireless device operates with a first cell group and a second cell group. The method comprises: receiving a command to transition the second cell group from a first mode of operation to a second mode of operation; transitioning the second cell group into the second mode of operation; modifying at least one parameter that was used for performing RLM associated with the second cell group while the second cell group was in the first mode of operation; and performing RLM according to the at least one modified parameter while the second cell group is in the second mode of operation.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node comprises: determining a first RLM configuration and a second RLM configuration for a wireless device capable of operating with a first cell group and a second cell group, wherein first RLM configuration is for use when the second cell group is in an activated mode of operation and the second RLM configuration is for use when the second cell group is in a deactivated mode of operation; and transmit the first and second RLM configurations to the wireless device.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages.

For example, in some embodiments the UE can perform limited/relaxed RLM related to a second cell group (e.g., SCG) while the second cell group (e.g., SCG) is in a power saving mode, which is useful in monitoring/ensuring that the UE has good radio link with the SCG if/when a transition to normal operating mode is required, without significant UE battery consumption.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
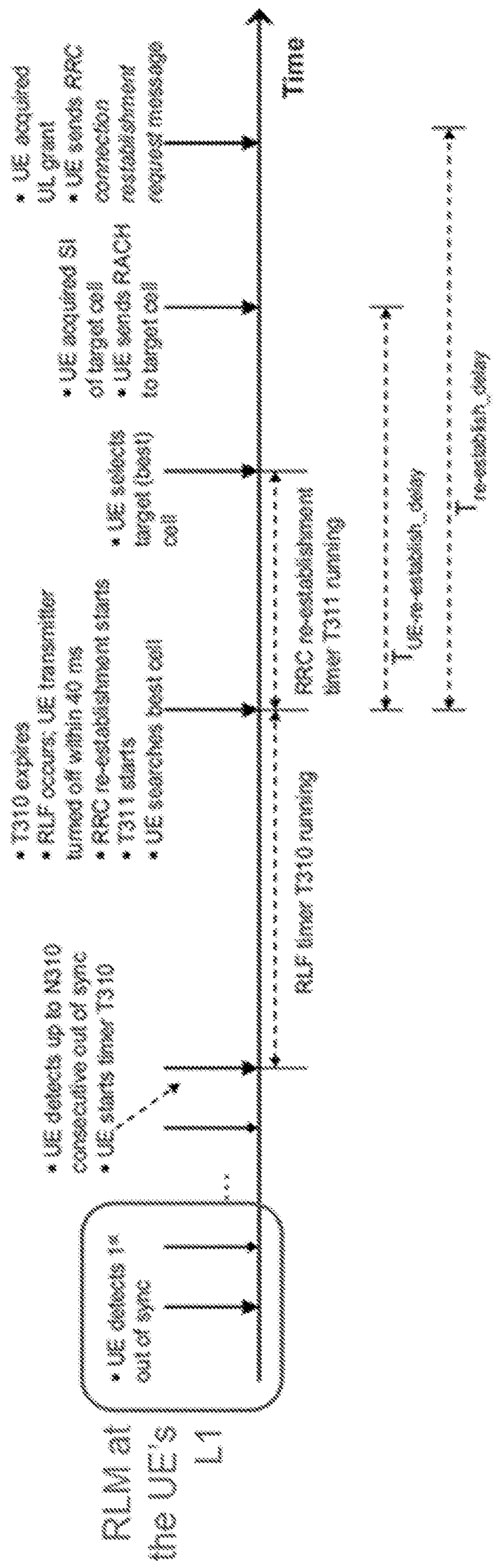
FIG. 1 is a timing diagram illustrating the relation between the counter N310 and the start of timer T310, and other procedures when the timer expires (declaration of RLF)
Figure 2:
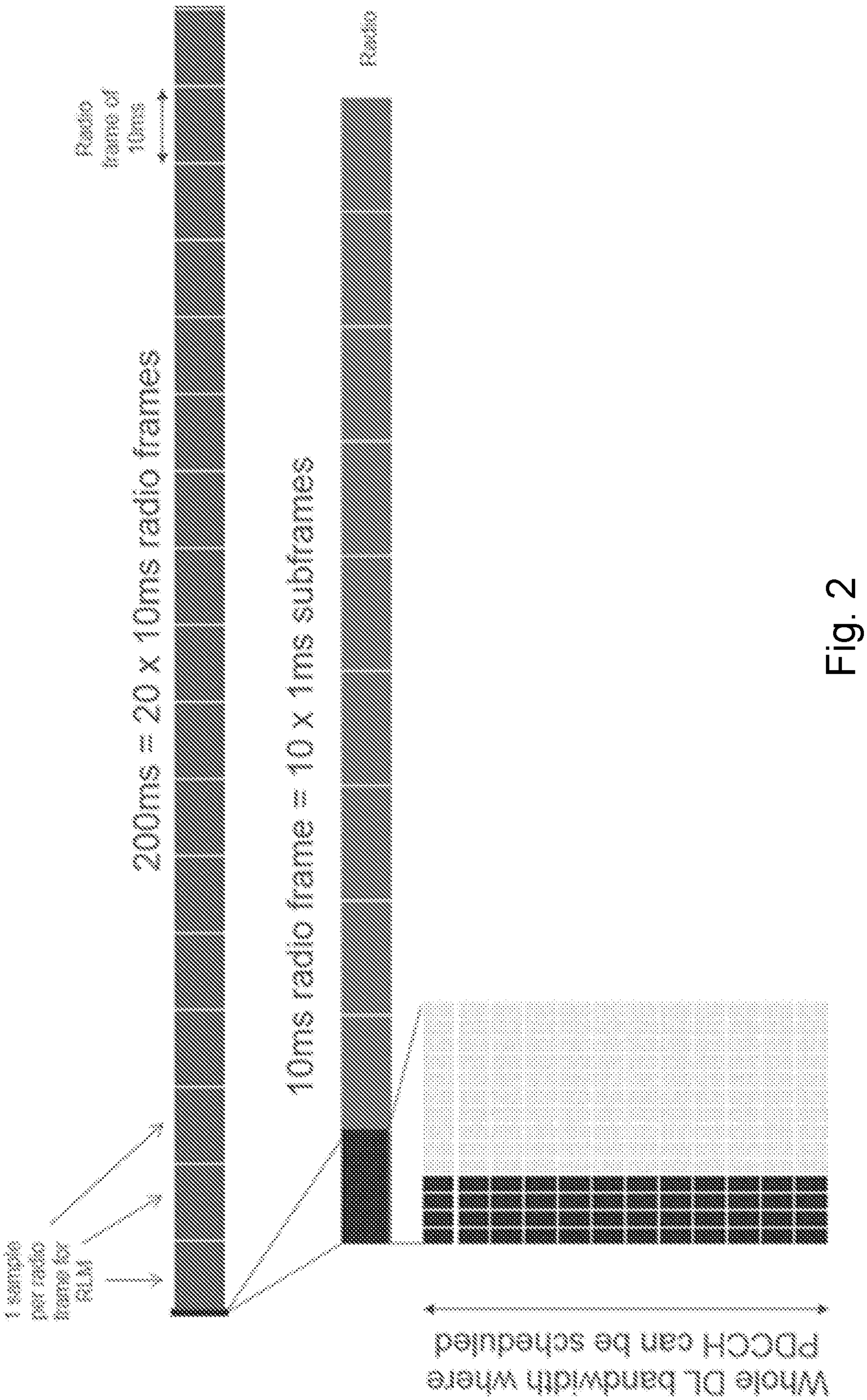
FIG. 2 is a time and frequency diagram illustrating PDCCH in a radio frame.
Figure 3:
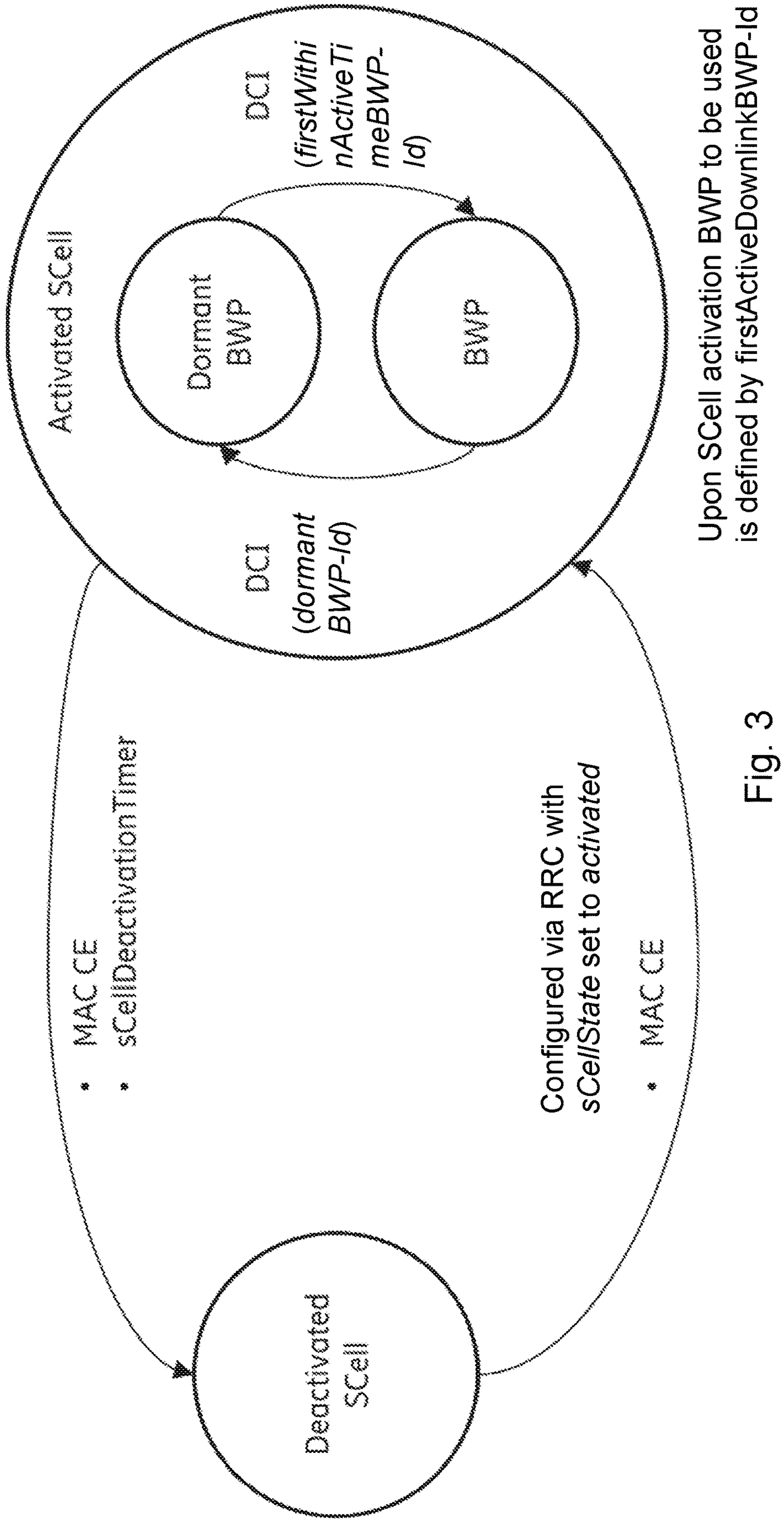
FIG. 3 is a state machine illustrating dormancy-like behavior for SCells in NR.

Based on the description above, certain challenges currently exist with radio link monitoring (RLM) for a secondary cell group (SCG) in power saving mode. Certain aspects of the present disclosure and their embodiments may provide solutions to these or other challenges. For example, particular embodiments include a wireless terminal (also referred to as a user equipment (UE)) configured with multi-radio dual connectivity (MR-DC), i.e., being configured with a first cell group (e.g., master cell group (MCG)) and a second cell group (e.g., secondary cell group (SCG)). The wireless terminal receives a command to transition the second cell group from a first mode of operation to a second mode of operation.

In one example, the first mode of operation is a normal operating mode and the second mode of operation is a power saving mode. In another example, the first mode of operation is a power saving mode and the second mode of operation is a normal operating mode.

The wireless terminal transitions the second cell group to the second mode of operation and modifies at least one parameter or requirement (e.g., periodicity, sampling rate, gaps, etc.) that were used for performing RLM associated with the second cell group while the second cell group was in the first mode of operation. The wireless terminal performs RLM according to the modified parameters/requirements while the second cell group is in the second mode of operation.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Particular embodiments are applicable for RLM and detection of radio problems for radio link failure (RLF) declaration.

The terms suspended secondary cell group (SCG) and SCG in power saving mode are used interchangeably. The term suspended SCG may also be referred to as deactivated SCG or inactive SCG. The terms resumed SCG, SCG in normal operating mode and SCG in non-power saving mode are used interchangeably. The terms resumed SCG may also be referred to as activated SCG or active SCG. The operation of the SCG operating in resumed or active mode may also be referred to as normal SCG operation or legacy SCG operation. Examples of operations are UE signal reception/transmission procedures, e.g., RLM measurements, reception of signals, transmission of signals, etc.

Particular examples are described wherein the second cell group is a SCG for a UE configured with dual connectivity (e.g., MR-DC). In that case, when the text refers to measurements on the SCG or measurements associated with the SCG are performed, that may correspond to performing measurements on a cell of the SCG, e.g., PSCell.

Terms like SCG and PSCell are described as one of the cells associated with the SCG. These can be, for example, a PSCell as defined in NR specifications (e.g., RRC TS 38.331), defined as a special cell (SpCell) of the SCG, or a primary SCG cell (PSCell), as follows: A secondary cell group is, for a UE configured with dual connectivity, the subset of serving cells comprising the PSCell and zero or more secondary cells (SCells). A special cell is, for dual connectivity operation, refers to the PCell of the MCG or the PSCell of the SCG, otherwise the term special cell refers to the PCell; and primary SCG cell (PSCell). For dual connectivity operation, the special cell is the SCG cell in which the UE performs random access when performing the reconfiguration with sync procedure.

For the sake of brevity, the examples herein mostly refer to and show examples wherein the second cell group is a SCG that can be suspended, for a UE configured with dual connectivity (e.g., MR-DC). However, the embodiments are equally applicable when the second cell group is a master cell group (MCG) for a UE configured with dual connectivity (e.g., MR-DC), wherein the MCG could be suspended, while the SCG is operating in normal mode.

A first example embodiment, A1, comprises a method performed by a wireless terminal (also referred to as a user equipment (UE)) configured with multi-radio dual connectivity (MR-DC), i.e., being configured with a first cell group (e.g., MCG) and a second cell group (e.g., SCG). The method comprises receiving a command to transition the second cell group from a first mode of operation to a second mode of operation; transitioning the second cell group into the second mode of operation; modifying at least one parameter or requirement that was used for performing RLM associated with the second cell group while the second cell group was in the first mode of operation; and performing RLM according to the modified parameters/requirements while the second cell group is in the second mode of operation.

A second example embodiment, A2, includes a method according to example embodiment A1, wherein the first cell group is a MCG and the second cell group is a SCG; or the first cell group is a SCG and the second cell group is a MCG.

A third example embodiment, A3, includes a method according to example embodiment A1, wherein the first mode of operation is a normal operating mode and the second mode of operation is a power saving mode.

A fourth example embodiment, A4, includes a method according to example embodiment A1, wherein the first mode of operation is a power saving mode of operation and second mode of operation is a normal mode of operation.

A fifth example embodiment, A5, includes a method according to example embodiment A1, wherein the UE is performing radio link monitoring on the SCG (e.g., PSCell), which may also be referred to as S-RLM.

A sixth example embodiment, A6, includes a method according to example embodiment A1, wherein the UE is configured with an RLM configuration for the second cell group (e.g., on the PSCell) to be used when the second cell group at the UE transitions to the second mode of operation.

In one embodiment, the RLM configuration to be used when the second cell group is in power saving mode is received in the same message the UE receives that initiates the transition of the second cell group to the power saving mode, e.g., an RRC Reconfiguration message or an RRC Release message (with second cell group suspend indication).

In one embodiment, the UE stores the RLM configuration that was used while in a normal operation and starts using the received configuration associated with the power saving mode. Later, upon transitioning the second cell group to a normal mode of operation (e.g., SCG is resumed), the UE restores the stored RLM configuration associated with the normal operating mode.

In one embodiment, when later transitioning back to the normal operating mode, the UE stores the RLM configuration that was used in the power saving mode, to be restored and used when/if the UE is transitioned again into a power saving mode. The RLM configuration associated with the second operating mode of the SCG is activated upon the SCG transitioning from the first operating mode to the second operating mode, and suspended upon transitioning back to the first operating mode.

In one embodiment, the RLM configuration to be used when second cell group is in power saving mode is received while the second cell group is operating in a normal mode, before the message to transition the second cell group to the power saving mode is received.

In one embodiment, the UE is provided with delta values (e.g., offsets) of the RLM parameters to be used in the power saving mode as compared to the normal operating mode. For example, the UE will subtract or add the provided delta values/offsets to the values used in the normal operating mode for the corresponding parameters.

In one embodiment, the RLM configuration is pre-defined at the UE, e.g., as defined in specification, possibly based on pre-determined conditions.

In one embodiment, the RLM configuration or parameter values (or the offsets corresponding to the differences between the values to be used for normal and power saving operating modes) are provided to the UE via broadcasted signaling (e.g., SIB). The network may broadcast RLM configuration/parameters both for the normal mode and the power saving mode, or just the configuration for the normal mode and offsets to be applied on top of the normal mode values to get the values for the power saving mode.

A seventh example embodiment, A7, includes a method according to example embodiment A6, wherein the at least one parameter associated to RLM is a Qout parameter associated to a given block error rate (BLER). In one embodiment the value for Qout used while the SCG is operating in the power saving mode is reduced as compared to the one used in normal mode. The result is that the estimated link quality of the PSCell needs to go below a value lower than the value used in normal mode of operation before the UE is considered to be out of sync with the PSCell, reflecting that in a power saving mode it is acceptable to have a worse link.

In one embodiment the value for Qout used while the SCG is operating in normal mode is increased as compared to the one used in the power saving mode. The result is that the estimated link quality of the PSCell can be higher than the value used in power saving mode of operation and the UE could be still considered to be out of sync with the PSCell, reflecting that in a normal operating mode, it is desirable to have a better link than in the power saving mode.

In particular embodiments, the at least one parameter associated to RLM is a Qin parameter associated to a given BLER. In some embodiments, the value for Qin used while the SCG is operating in power saving mode is reduced as compared to the one used in normal mode. The result is that the estimated link quality of the PSCell does not need to be as high as the value used in normal mode of operation before the UE is considered to be back in sync with the PSCell, reflecting that in a power saving mode it is acceptable to have a worse link.

In some embodiments, the value for Qin used while the SCG is operating in normal mode is increased as compared to the one used in the power saving mode; The result of this is that the estimated link quality of the PSCell has to be higher than the value used in power saving mode of operation before the UE could be considered to be back in sync with the PSCell, reflecting that in a normal operating mode, it is desirable to have a better link than in the power saving mode In particular embodiments, the at least one parameter associated to RLM is a BLER value to generate Qout. In one embodiment, the value is increased, e.g. from 10% to 20%, while the SCG is operating in power saving mode as compared to the one used in normal mode. The result is that the estimated link quality of the PSCell can be lower than normal mode of operation (i.e., expected to result in a higher block error rate) before the UE is considered to be out of sync with the PSCell, reflecting that it is acceptable to have a worse link in the power saving mode.

In one embodiment, the value is decreased, e.g. from 20% to 10%, while the SCG is operating in normal mode as compared to the one used in power saving mode. The result is that the estimated link quality of the PSCell has to be better than in the power saving mode of operation (i.e., expected to result in a lower block error rate) or else the UE could be considered to be out of sync with the PSCell, reflecting that it is desirable to have a better link in the normal mode.

In particular embodiments, the at least one parameter associated to RLM is a BLER value to generate Qin. In one embodiment, the value is increased, e.g. from 2% to 5%, while the SCG is operating in power saving mode as compared to the one used in normal mode. In one embodiment, the value is decreased, e.g. from 5% to 2%, while the SCG is operating in normal mode as compared to the one used in power saving mode.

In particular embodiments, the at least one parameter associated to RLM is a pair of BLER values for Qout and Qin. In one embodiment, the out-of-sync block error rate ($BLER_{out}$ t) and in-sync block error rate ($BLER_{in}$) to be used while the SCG is in power saving mode are determined from the network configuration, e.g. via parameter rlminSyncOutOfSyncThreshold-suspendedSCG signalled by higher layers. When the UE is not configured with rlmInSyncOutOfSyncThreshold-suspendedSCG from the network, the UE determines out-of-sync and in-sync block error rates from Configuration #0 in the table below, by default for suspended second cell group:

| Out-of-sync and in-sync block error rates | | |
|---|---|---|
| Configuration | $BLER_{out}$ | $BLER_{in}$ |
| 0 | 10% | 2% |

In particular embodiments, the at least one parameter associated to RLM is a maximum number of beams/RLM-RS (radio link monitoring reference signal(s)) to be used for RLM for SCG operating in power saving mode. In one embodiment, the UE monitors up to $N_{RLM}$ RLM-RS resources of the same or different types in each corresponding carrier frequency range for the SCG operating in power saving mode (e.g., for the PSCell), depending on a maximum number Lmax of SSBs per half frame, wherein X1, X2, X3 can be pre-defined or configurable values. This defines the maximum number of RS resources for RLM that can be monitored when the UE is in suspended mode for the second cell group (e.g., suspended SCG).

| Carrier frequency range of SpCell of the second cell group while in power saving mode of operation | | Maximum number of RLM-RS resources, $N_{RLM}$ |
|---|---|---|
| FR1, ≤3 GHz[Note] | 4 | 2-X1 |
| FR1, >3 GHz[Note] | 8 | 4-X2 |
| FR2 | 64 | 8-X3 |

In particular embodiments, the at least one parameter associated to RLM is a physical downlink control channel (PDCCH) transmission parameter for out-of-sync evaluation. This may comprise at least one of the parameters or any combination of the following: DCI format, number of control orthogonal frequency division multiplexing (OFDM) symbols, aggregation level (CCE), ratio of hypothetical PDCCH RE energy to average SSS RE energy, ratio of hypothetical PDCCH DMRS energy to average SSS RE energy, bandwidth (PRBs), sub-carrier spacing (kHz), DMRS precoder granularity, REG bundle size, CP length, mapping from REG to CCE, etc.

In particular embodiments, the at least one parameter associated to RLM is a PDCCH transmission parameters for in-sync evaluation. This may comprise at least one of the parameters or any combination of the following: DCI format, number of control OFDM symbols, aggregation level (CCE), ratio of hypothetical PDCCH RE energy to average SSS RE energy, ratio of hypothetical PDCCH DMRS energy to average SSS RE energy, bandwidth (PRBs), sub-carrier spacing (kHz), DMRS precoder granularity, REG bundle size, CP length, mapping from REG to CCE, etc.

In particular embodiments, the at least one parameter associated to RLM is a RS type and/or RS type configuration. In one embodiment, If CSI-RS is being used for RLM, upon switching the SCG to power saving mode of operation, the UE starts to use SSB as RS type for RLM of the PSCell. One possible motivation for using SSB when the second cell group is in power saving mode is that the network may not want to transmit CSI-RSs for UEs in suspended mode, as that may consume more power than the transmission of SSBs, e.g., when CSI-RS has wide bandwidth and/or shorter periodicity. On the network side, SSBs may anyways be transmitted while CSI-RS may only be used in normal mode of operation which may also benefit the network in terms of energy savings (as less reference signals are transmitted for UEs that have their SCG in power saving mode).

In some embodiments, if a mix of CSI-RS and SSB is being used for RLM of the PSCell, upon switching the SCG to power saving mode of operation, the UE will use only the SSB as RS type for RLM of the PSCell.

In some embodiments, if an RS type associated to an active transmission configuration indicator (TCI) state is being used for RLM of the PSCell, upon switching the SCG to power saving mode, the UE starts to use SSB as RS type for RLM of the PSCell.

In some embodiments, if SSB is being used for RLM of the PSCell, upon switching the SCG to power saving mode of operation, the UE continues to use SSB as RS type for RLM of the PSCell.

In some embodiments, if SSB is being used for RLM of the PSCell, upon switching the SCG to power saving mode of operation, the UE starts to use CSI-RS as RS type for RLM of the PSCell. This may be useful when the network wants the UE to perform RLM on a wide beam, e.g., if the CSI-RS is transmitted with a longer periodicity compared to the SSB.

In some embodiments, a default RS configuration is defined for SCG operating in power saving mode, e.g., SSB with strongest link quality is used for RLM of the PSCell.

In some embodiments, the UE performs RLM only on the best beam, e.g., SSB with strongest quality, possibly measured based on SINR used to generate Qout/Qin.

In particular embodiments, the at least one parameter associated to RLM is a beam configuration/RS configuration. In some embodiments, if CSI-RS is being used for RLM of the PSCell, wherein the CSI-RS is being transmitted in narrow beams, upon transitioning the SCG to power saving mode of operation, the UE starts to use SSB as RS type for RLM of the PSCell using wide beams.

In some embodiments, the UE is configured with an RLM configuration to be used for the PSCell when it transitions the SCG to a power saving mode of operation. The configuration comprises, in the case of SSB, an SSB index (derived from a time index in the physical broadcast channel (PBCH) and/or a PBCH/DRMS scrambling). For example, each beam can be identified by an SSB index. For CSI-RS, a resource index is also defined (signaled with the CSI-RS configuration). The RLM configuration is activated when the transition to suspended mode occurs, wherein the configuration may comprise at least one different parameter compared to the RLM configuration for the PSCell to be used in normal mode of operation.

In particular embodiments, the at least one parameter associated to RLM is a RLM evaluation period for out-of-sync. In one embodiment, the UE evaluates whether the downlink radio link quality on the configured RLM-RS resource on the PSCell estimated over the last $T_{Evaluate\_out\_SSB\_suspended\_scg}$ [ms] period becomes worse than the threshold $Q_{out\_SSB}$ within $T_{Evaluate\_out\_SSB\_suspended\_scg}$ [ms] evaluation period. In other words, an evaluation period for out-of-sync related measurements for SCG in power saving mode is defined. That can be different from the one defined for normal mode of operation, e.g. longer, indicating a more relaxed requirement so the UE perform less measurements when the SCG is operating in power saving mode.

In some embodiments, the value of the parameter or the way it is calculated differs depending on the frequency range (FR) of the PSCell, e.g. if FR1 (e.g., between 400 MHz to 7 GHz) or if FR2 (e.g., between 24 GHz to 52.6 GHz) in NR terminology defined in TS 36.133, or any other frequency range FR-X.

In some embodiments, the evaluation period ($T_{OS-S}$) for out-of-sync related measurements for SCG in power saving mode is calculated based on the periodicity of the SSBs, wherein the periodicity to be used as input is longer than the SSB periodicity considered in the normal mode of operation, e.g. by a factor of K1 (wherein K1 can be equal to a pre-defined value or configurable). For example, if the SSB periodicity of the PSCell is 20 ms, the SSB periodicity of the PSCell to be considered for the purpose of calculating the evaluation period to be used for a second cell group (e.g., for the SpCell of the SCG) to perform out-of-sync evaluations is K1×20 ms.

In yet another example, the UE determines the OOS evaluation period ($T_{OS-S}$) for SCG in power saving mode as function of the OOS evaluation period ($T_{OS-N}$) in the normal mode of operation and K1, e.g. $T_{OS-S}=f(T_{OS-N}, k1)$. In one specific example: $T_{OS-S}=K1*T_{OS-N}$. Examples of K1 are 10, 20, 40, 80, 160 etc. In another example, K1 may further depend on RLM resource periodicity ($T_{RLM-R}$), e.g. larger K1 for shorter $T_{RLM-R}$ and vice versa. For example, K1=10 for $T_{RLM-R}\leq 20$ ms and K1=20 for $T_{RLM-R}>20$ ms. In yet another example K1 may further depend on number of serving cells (Nserv i.e. SpCell and SCells) in the SCG that is suspended. For example, larger K1 for shorter when Nserv is equal to or below threshold compared to the case when Nserv is above the threshold, e.g. K1=10 for Nserv≤2 and K1=20 for Nserv>2. This enables similar level of UE power saving regardless of the number of serving cells because the UE has to also measure on SCells.

In some embodiments, the evaluation period for out-of-sync related measurements for suspended second cell group is calculated based on a set of parameters (e.g., periodicity of SSB) scaled by a factor K3.

In particular embodiments, the at least one parameter associated to RLM is a RLM evaluation period for in-sync. In some embodiments, the UE evaluates whether the downlink radio link quality on the configured RLM-RS resource on the PSCell estimated over the last $T_{Evaluate\_in\_SSB\_suspended\_scg}$ [ms] period becomes better than the threshold $Q_{in\_SSB}$ within $T_{Evaluate\_in\_SSB\_suspended\_scg}$ [ms] evaluation period. In other words, an evaluation period for in-sync related measurements for SCG in power saving mode is defined. That can be different from the one defined for normal mode of operation, e.g. longer, indicating a more relaxed requirement so the UE perform less measurements when the second cell group is suspended and saves more energy.

In some embodiments, the value of the parameter or the way it is calculated differs depending in the frequency range (FR) of the PSCell e.g. if FR1 or if FR2 in NR terminology defined in TS 36.133, or any other frequency range FR-X.

In some embodiments, the evaluation period for in-sync related measurements for suspended second cell group is calculated based on the periodicity of the SSBs, wherein the periodicity to be used as input is longer than the SSB periodicity considered in the normal mode of operation, e.g. by a factor of K2 (wherein K2 can be equal to a pre-defined value or configurable). For example, if the SSB periodicity of the PSCell is 20 ms, the SSB periodicity of the PSCell to be considered for the purpose of calculating the evaluation period to be used for a second cell group (e.g., for the PSCell) to perform in-sync evaluations would be K2×20 ms. In yet another example, UE determines the in-sync (IS) evaluation period (TIS-S) for suspended SCG as function of the IS evaluation period ($T_{OS-N}$) in the normal mode of operation and K2, e.g. $T_{IS-S}=g(T_{IS-N}, k2)$. In one specific example: $T_{IS-S}=K2*T_{IS-N}$. Examples of K1 are 10, 20, 40, 80, 160, etc. In another example, K1 may further depend on RLM resource periodicity ($T_{RLM-R}$), e.g. larger K2 for shorter $T_{RLM-R}$ and vice versa. For example, K2=10 for $T_{RLM-R}\leq 20$ ms and K2=20 for $T_{RLM-R}>20$ ms. In yet another example, K1 may further depend on number of serving cells (Nserv i.e. SpCell and SCells) in the SCG that is suspended. For example, larger K2 for shorter when Nserv is equal to or below a threshold compared to the case when Nserv is above the threshold, e.g. K2=10 for Nserv≤2 and K2=20 for Nserv>2. This enables similar level of UE power saving regardless of number of serving cells because the UE has to also measure on SCells.

In some embodiments, K2 equals K1, as defined above for out-of-sync evaluations.

The example above can be represented in a table format, as shown below when the second cell group is a secondary cell group of a UE in MR-DC:

Evaluation period $T_{Evaluate\_out\_SSB}$ and $T_{Evaluate\_in\_SSB}$ for FR1 (including for suspended second cell group cell)

| Configuration | $T_{Evaluate\_out\_SSB}$ (ms) | $T_{Evaluate\_in\_SSB}$ (ms) |
|---|---|---|
| no DRX | Max(200, Ceil(10 □ P) □ $T_{SSB}$) | Max(100, Ceil(5 □ P) □ $T_{SSB}$) |
| DRX cycle ≤320 ms | Max(200, Ceil(15 □ P) □ Max($T_{DRX}$, $T_{SSB}$)) | Max(100, Ceil(7.5 □ P) □ Max($T_{DRX}$, $T_{SSB}$)) |
| DRX cycle >320 ms | Ceil(10 □ P) □ $T_{DRX}$ | Ceil(5 □ P) □ $T_{DRX}$ |

-continued

| Evaluation period $T_{Evaluate\_out\_SSB}$ and $T_{Evaluate\_in\_SSB}$ for FR1 (including for suspended second cell group cell) | | |
|---|---|---|
| Configuration | $T_{Evaluate\_out\_SSB}$ (ms) | $T_{Evaluate\_in\_SSB}$ (ms) |
| Suspended SCG (e.g. 1) | Max(200, Ceil(10 □ P) □ K1 □ $T_{SSB}$) | Max(100, Ceil(5 □ P) □ K2 □ $T_{SSB}$) |
| Suspended SCG (e.g. 2) | Max(400, Ceil(10 □ P) □ K1 □ $T_{SSB}$) | Max(200, Ceil(5 □ P) □ K2 □ $T_{SSB}$) |

NOTE:
$T_{SSB}$ is the periodicity of the SSB configured for RLM. $T_{DRX}$ is the DRX cycle length.

For FR1, $$P = \frac{1}{1 - \frac{T_{SSB}}{MRGP}},$$

when in the monitored cell there are measurement gaps configured for intra-frequency, inter-frequency or inter-RAT measurements, and these measurement gaps are overlapping with some but not all occasions of the SSB, and P=1 when in the monitored cell there are no measurement gaps overlapping with any occasion of the SSB.

In some embodiments, the parameter P is used to scale differently the evaluation period for the case where the second cell group is in suspended mode of operation. For example, P can be greater than 1.

In particular embodiments, the at least one parameter associated to RLM is a RLM evaluation upon triggering radio link failure related procedure in suspended SCG. In some embodiments, upon triggering a condition related to RLF, the UE estimates the radio link quality using the RLM resources over evaluation period ($T_{RLF\text{-}S}$), which is different than the OOS evaluation period ($T_{OS\text{-}S}$) used under suspended SCG. For example, $T_{RLF\text{-}S}$ is shorter than $T_{OS\text{-}S}$. The purpose is to enable the UE to determine the status of the radio link quality faster when any condition related to RLF is triggered/met. An example of triggering of such condition comprising starting of the RLM timer, e.g. T310. The UE continues evaluating the link quality over $T_{RLF\text{-}S}$ until the UE leaves the condition related to the RLF. For example, the UE reverts to evaluate the radio link quality over $T_{OS\text{-}S}$ if the RLF timer (e.g., T310) is reset. In one example, the $T_{RLF\text{-}S}$ and OOS evaluation period in normal SCG operation ($T_{OS\text{-}N}$) are related by a function, e.g. $T_{RLF\text{-}S}$=h($T_{OS\text{-}N}$, K4). In one specific example, $T_{RLF\text{-}S}$=$T_{OS\text{-}N}$*K4. In yet another specific example, K4=1 i.e. $T_{RLF\text{-}S}$=$T_{OS\text{-}N}$. In another example $T_{RLF\text{-}S}$ and $T_{OS\text{-}S}$ are related by a function, e.g. $T_{RLF\text{-}S}$=h($T_{OS\text{-}S}$, K5).). In one specific example, $T_{RLF\text{-}S}$=$T_{OS\text{-}O}$*K5. The parameters K4 and K5 can be pre-defined or configurable by the network node, e.g. by PCell.

In particular embodiments, the at least one parameter associated to RLM is a RLM evaluation during transition between SCG suspension/resumption. In one embodiment, a UE estimates the radio link quality using the RLM resources over an evaluation period ($T_{transit\text{-}S}$) during transition phase ($D_{transit}$) when switching between SCG suspended state and SCG resume/active state. $T_{transit\text{-}S}$ can be OOS evaluation period or in-sync evaluation period. The active state herein means normal SCG operation. The duration $D_{transit}$ starts upon receiving the SCG switching command/message to change the state between suspend and resume/active. In one example $D_{transit}$ can be the same when switching from SCG suspend to SCG resume/active states or vice versa. In another example the duration depends on the direction of the transition, e.g. $D_{transit,1}$ when switching from SCG active state to SCG suspend state and $D_{transit,2}$ when switching from SCG suspend to SCG resume states. The duration $D_{transit}$, $D_{transit,1}$ or $D_{transit,2}$ can be pre-defined or configured. In one example, during the transition period the $T_{transit\text{-}S}$ is function of OOS or IS evaluation period in active state ($T_{evaluate\text{-}N}$) and parameter, K6 e.g. $T_{transit\text{-}s}$=f2(K6, $T_{evaluate\text{-}N}$). In one specific example: $T_{transit\text{-}S}$= K6*$T_{evaluate\text{-}N}$, where K6 can be pre-defined or configurable. In one example $T_{transit\text{-}S}$ is the same used by the UE during the normal SCG operation, e.g. K6=1. In one example the above rule may apply for specific transition, e.g., from SCG active to SCG suspend states or it may apply to both type of transitions. This mechanism enables the UE to revert to normal operation (e.g., reception of control channel, etc.) rapidly in case the UE is commanded to revert to the active state during the transition phase.

In particular embodiments, the at least one parameter associated to RLM is a measurement gap configuration, if needed, to be used for performing the RLM related measurements on the PSCell while the SCG is in power saving mode:

In some embodiments, if a measurement gap is required to perform RLM measurements on the PSCell, no RLM measurements will be performed on the PSCell.

In one embodiment, if a measurement gap is required to perform RLM measurements on the PSCell, RLM measurements will be performed only when there is no UL/DL data activity on the MCG (i.e., UE will not interrupt any UL/DL data activity on the MCG to perform RLM measurements on the PSCell).

In some embodiments, a shorter measurement gap length is used as compared to the gap length used during normal operation.

In some embodiments, a longer periodicity is used as compared to the measurement gap periodicity during normal operation.

An eighth example embodiments, A8, includes a method according to example embodiment A6, wherein the at least one parameter associated to the detection of problems related to the physical layer (i.e., for the detection of RLF) and is at least one of the parameters that is, for example, configured by rlf-timersAndConstants field in SIB1 of the PSCell or/and the ue-timersAndConstants field included in the spCellConfig field of the SCG cell group config.

In some embodiments, the UE is provided with two sets of rlf-timersAndConstants in SIB1 of the PSCell, one to be used in normal operating mode, another to be used in power saving mode.

In some embodiments, the UE is provided with one rlf-timersAndConstants in SIB1 of the PSCell, which are the values to be used during normal mode of operation, and also provided with offset values to be applied on top of each timer/constant for power saving mode.

In some embodiments, the UE is provided with two sets of ue-timersAndConstants in sPCellConfig of the SCG cell group configuration, one to be used in normal operating mode, another to be used in power saving mode.

In some embodiments, the UE is provided with one ue-timersAndConstants in sPCellConfig of the SCG cell group configuration, which are the values to be used during normal mode of operation, and also provided with offset values to be applied on top of each timer/constant for power saving mode.

In some embodiments, the T310 associated with the power saving mode has a higher value than the T310 associated with the normal operating mode. That is, the UE may tolerate longer delays to get back in sync to the PSCell after detecting out of sync in the power saving mode as compared to the normal mode. If the T310 for the power saving mode was communicated via an offset to be applied to the T310 value in rlf-timersAndConstants in SIB1 of the PSCell or ue-timerAndConstants of the sPCellConfig of the SCG cell group configuration, the offset value could be a positive value to be added on the T310 included in rlf-timersAndConstants or ue-timersAndConstants (e.g., offset value of 20 ms means T310 for the power saving mode=T310 for the normal mode+20 ms).

In some embodiments, the N310 associated with the power saving mode has a higher value than the N310 associated with the normal operating mode. That is, the UE may wait for more out of sync indications from lower layers on the PSCell before starting the T310 timer. If the N310 for the power saving mode was communicated via an offset to be applied to the N310 value in rlf-timersAndConstants in SIB1 of the PSCell or ue-timerAndConstants of the sPCellConfig of the SCG cell group configuration, the offset value could be a positive value to be added on the N310 included in rlf-timersAndConstants or ue-timersAndConstants (e.g., offset value of n5, meaning that N310 for the power saving mode=5+the N310 for the normal mode, i.e. 5 more out of sync indications need to be received from the lower layers of the PSCell before the UE starts T310 for the PSCell).

In some embodiments, the N311 associated with the power saving mode has a lower value than the N311 associated with the normal operating mode. That is, the UE may need to wait for fewer in sync indications from lower layers on the PSCell (after it has detected out of sync on the PSCell), before considering S-RLF has occurred.

If the N311 for the power saving mode was communicated via an offset to be applied to the N311 value in rlf-timersAndConstants in SIB1 of the PSCell or ue-timerAndConstants of the sPCellConfig of the SCG cell group configuration, the offset value could be a positive value to be subtracted from the N311 included in rlf-timersAndConstants or ue-timersAndConstants (e.g., offset value of n5, meaning that N311 for the power saving mode=the N310 for the normal mode—5, i.e. the UE will stop the T310 for the PSCell after receiving N310-5 in sync indications).

Figure 4:
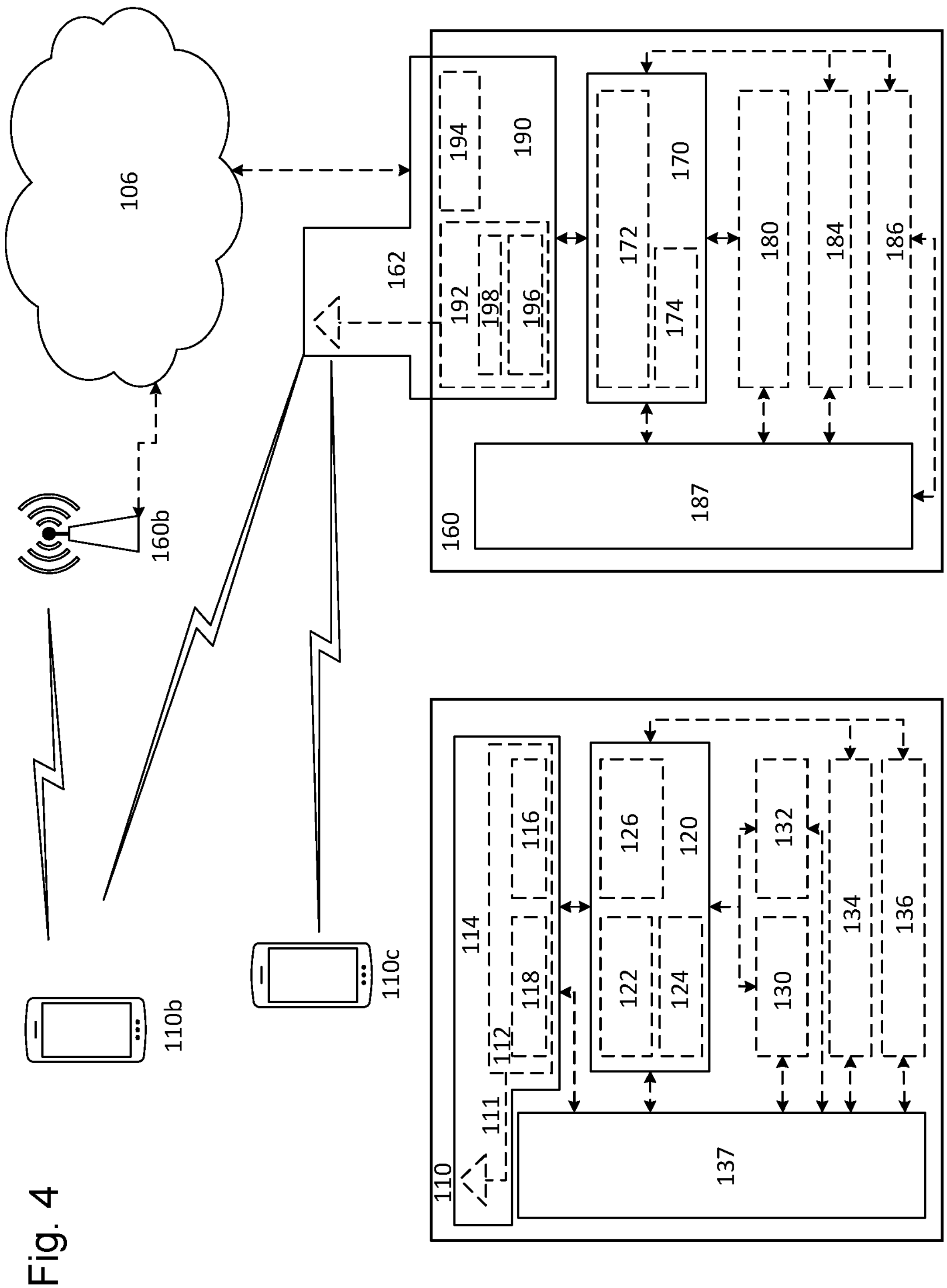
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 5:
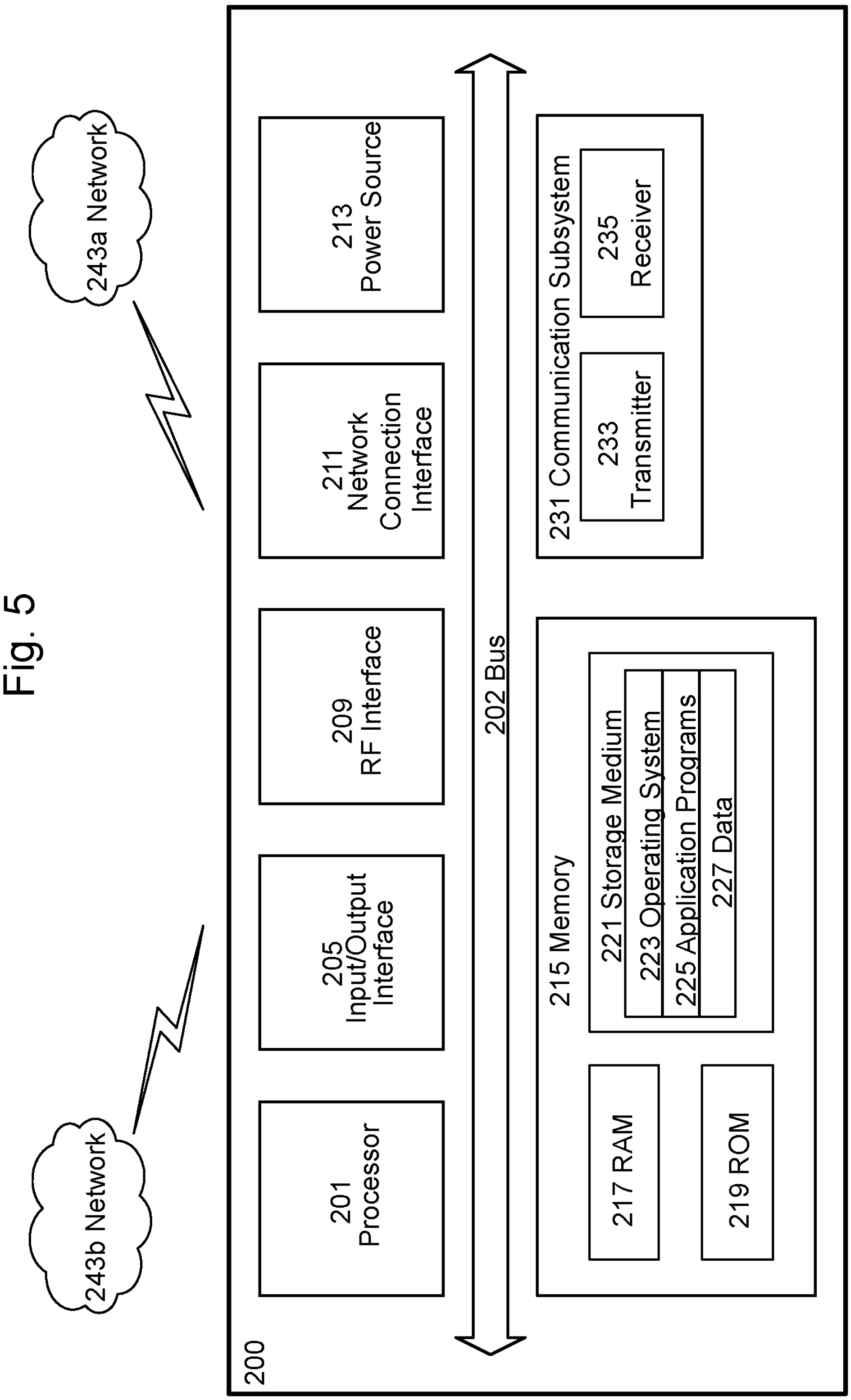
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
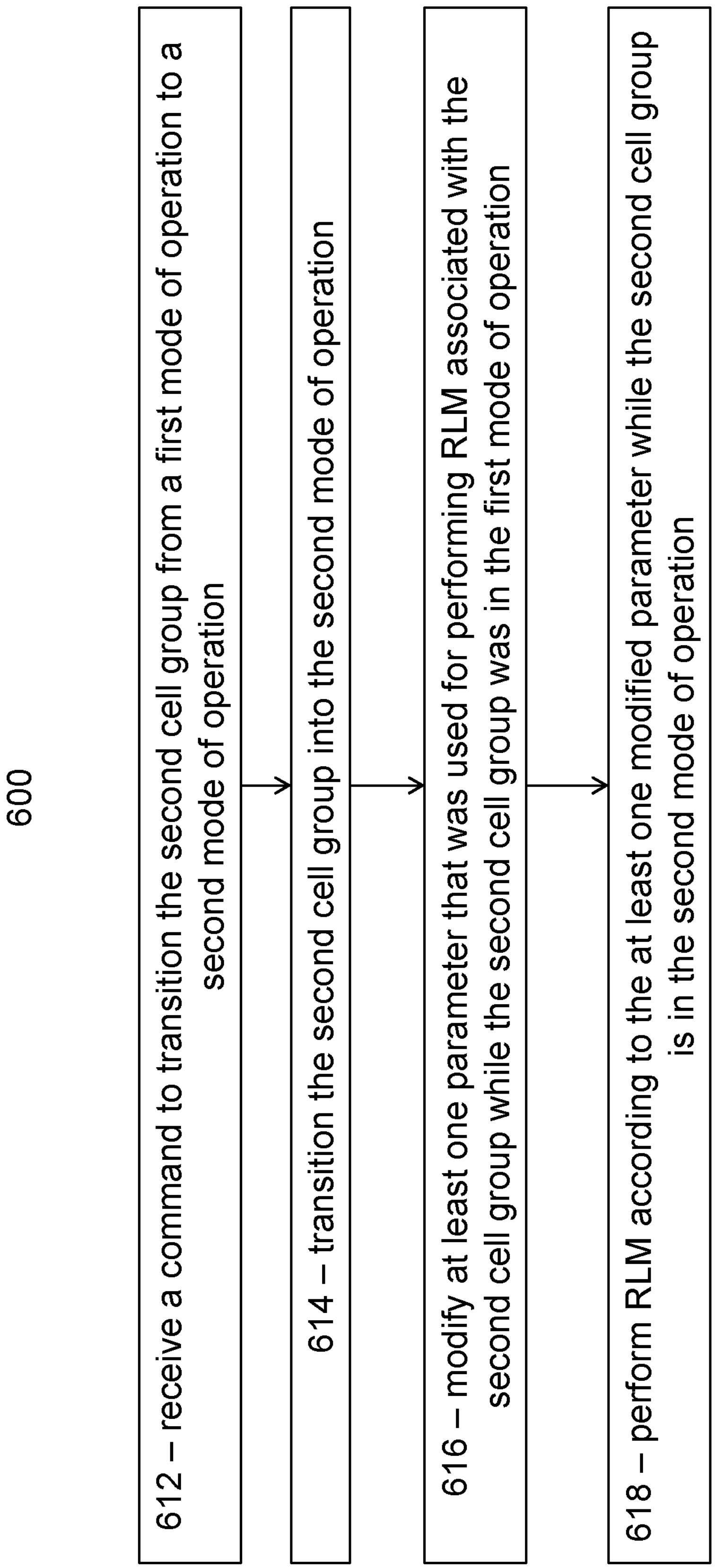
FIG. 6 is flowchart illustrating an example method in a wireless device, according to certain embodiments.

FIG. 6 is a flowchart illustrating an example method in a wireless device, according to certain embodiments. In particular embodiments, one or more steps of FIG. 6 may be performed by wireless device 110 described with respect to FIG. 4. The wireless device is operating with a first cell group and a second cell group (e.g., operating in dual connectivity).

The method begins at step 612, where the wireless device (e.g., wireless device 110) receiving (612) a command to transition the second cell group from a first mode of operation to a second mode of operation. For example, the first mode of operation may comprise a normal operating mode and the second mode of operation may comprise a power saving mode, or the first mode of operation may comprise a power saving mode and the second mode of operation may comprise a normal operating mode.

In particular embodiments, the first cell group is a MCG and the second cell group is a SCG, or the first cell group is a SCG and the second cell group is a MCG.

At step 614, the wireless device transitions the second cell group into the second mode of operation. For example, the wireless device may transition the second cell group into or out of a power saving mode.

At step 616, the wireless device modifies at least one parameter that was used for performing RLM associated with the second cell group while the second cell group was in the first mode of operation. For example, when transitioning to a power saving mode, the wireless device may relax the RLM parameters to increase power savings. When transitioning out of power saving mode, the wireless device may want to restore the normal RLM parameters.

In particular embodiments, modifying the at least one parameter comprises applying a delta value to a parameter used in the first mode of operation for use when the second cell group transitions to the second mode of operation. As a few examples, the at least one parameter may comprise a BLER associated with one or more of an IS threshold and an OOS threshold (e.g., increasing or decreasing the threshold to relax the IS or OOS requirements). The at least one parameter may comprise a PDCCH transmission parameter or an evaluation duration for one or more of IS evaluation and OOS evaluation.

The at least one parameter may comprise a reference signal type, and wherein the reference signal type is at least one of a channel state information reference signal (CSI-RS) and a synchronization signal block (SSB). For example, the wireless device may monitor a different type of reference signal when in power saving mode than when in normal mode.

The at least one parameter may comprise a beam configuration, wherein the beam configuration comprises at least one of a narrow beam configuration and a wide beam configuration. The at least one parameter may comprise a maximum number of reference signals used for RLM.

The at least one parameter may comprise a measurement gap, a timer associated with determining RLF, or a periodicity of a reference signal.

Although particular examples are described with respect to FIG. 6, the RLM parameters may be modified according to any of the embodiments and examples described herein.

Modifications, additions, or omissions may be made to method 600 of FIG. 6. Additionally, one or more steps in the method of FIG. 6 may be performed in parallel or in any suitable order.

Figure 7:
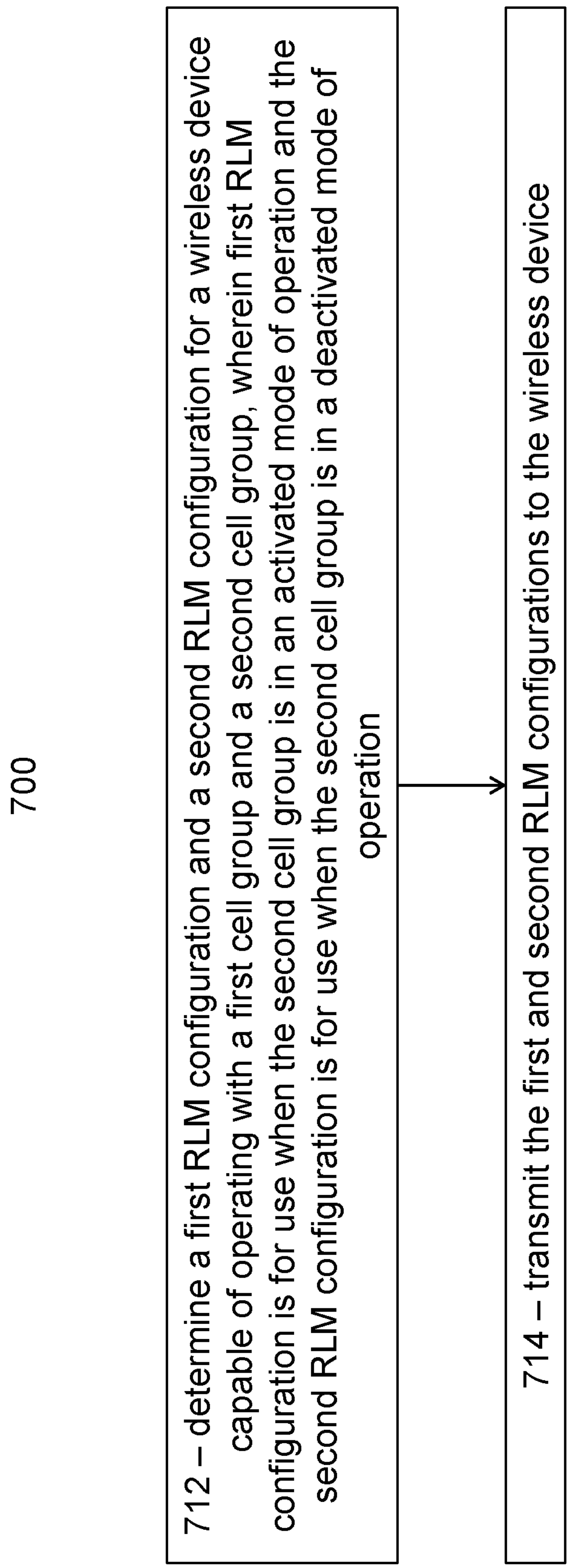
FIG. 7 is flowchart illustrating an example method in a network node, according to certain embodiments.

FIG. 7 is a flowchart illustrating an example method in a network node, according to certain embodiments. In particular embodiments, one or more steps of FIG. 7 may be performed by network node 160 described with respect to FIG. 4.

The method begins at step 712, where a network node (e.g., network node 160) determines a first RLM configuration and a second RLM configuration for a wireless device capable of operating with a first cell group and a second cell group, wherein first RLM configuration is for use when the second cell group is in an activated mode of operation and the second RLM configuration is for use when the second cell group is in a deactivated mode of operation. The RLM configurations are described with respect to FIG. 6 and any of the other embodiments and examples described herein.

At step 714, the network node transmits the first and second RLM configurations to the wireless device.

Modifications, additions, or omissions may be made to method 700 of FIG. 7. Additionally, one or more steps in the method of FIG. 7 may be performed in parallel or in any suitable order.

Figure 8:
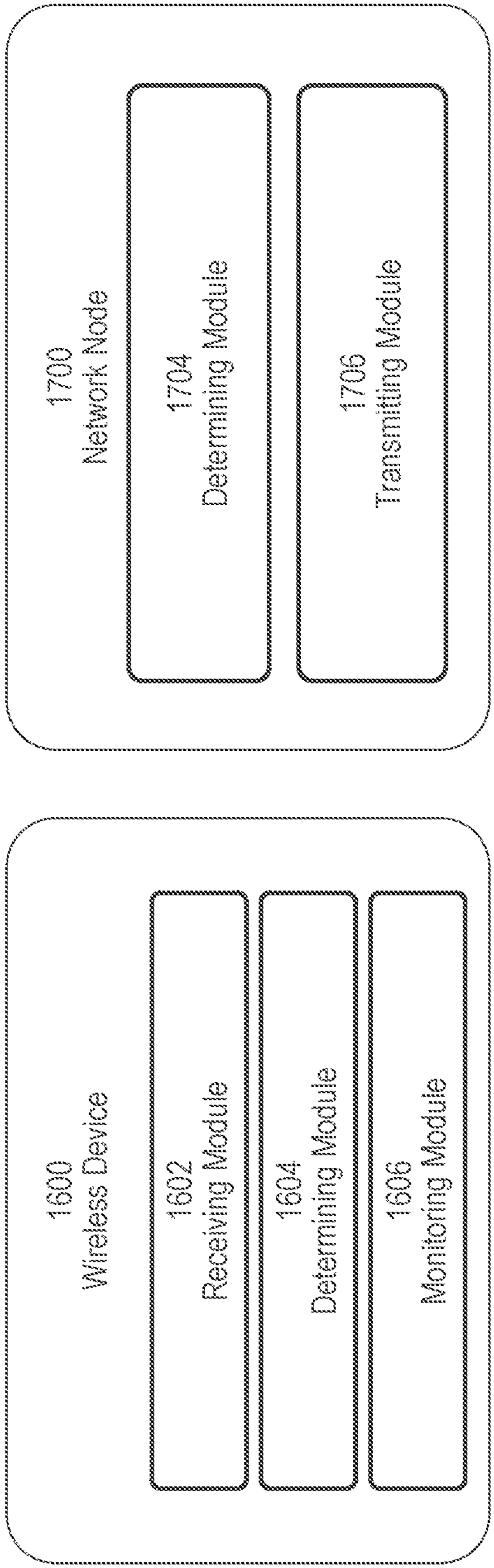
FIG. 8 illustrates a schematic block diagram of a wireless device and a network node in a wireless network, according to certain embodiments.

FIG. 8 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 4). Apparatuses 1600 and 1700 are operable to carry out the example methods described with reference to FIGS. 6 and 7, respectively, and possibly any other processes or methods disclosed herein. It is also to be understood that the methods of FIGS. 6 and 7 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, monitoring module 1606, and any other suitable units of apparatus 1600 to perform corresponding functions according one or more embodiments of the present disclosure. Similarly, the processing circuitry described above may be used to cause determining module 1704, transmitting module 1706, and any other suitable units of apparatus 1700 to perform corresponding functions according one or more embodiments of the present disclosure.

As illustrated in FIG. 8, apparatus 1600 includes receiving module 1602 configured to receive a command to transition a cell group between a first and second mode of operation (e.g., power saving mode and normal mode). Determining module 1604 is configured to transition between modes of operation and modify RLM parameters according to any of the embodiments and examples described herein. Monitoring module 1606 is configured to perform RLM, according to any of the embodiments and examples described herein.

As illustrated in FIG. 8, apparatus 1700 includes determining module 1704 configured to determine a RLM configuration according to any of the embodiments and examples described herein. Transmitting module 1706 is configured to transmit an RLM configuration to a wireless device, according to any of the embodiments and examples described herein.

Figure 9:
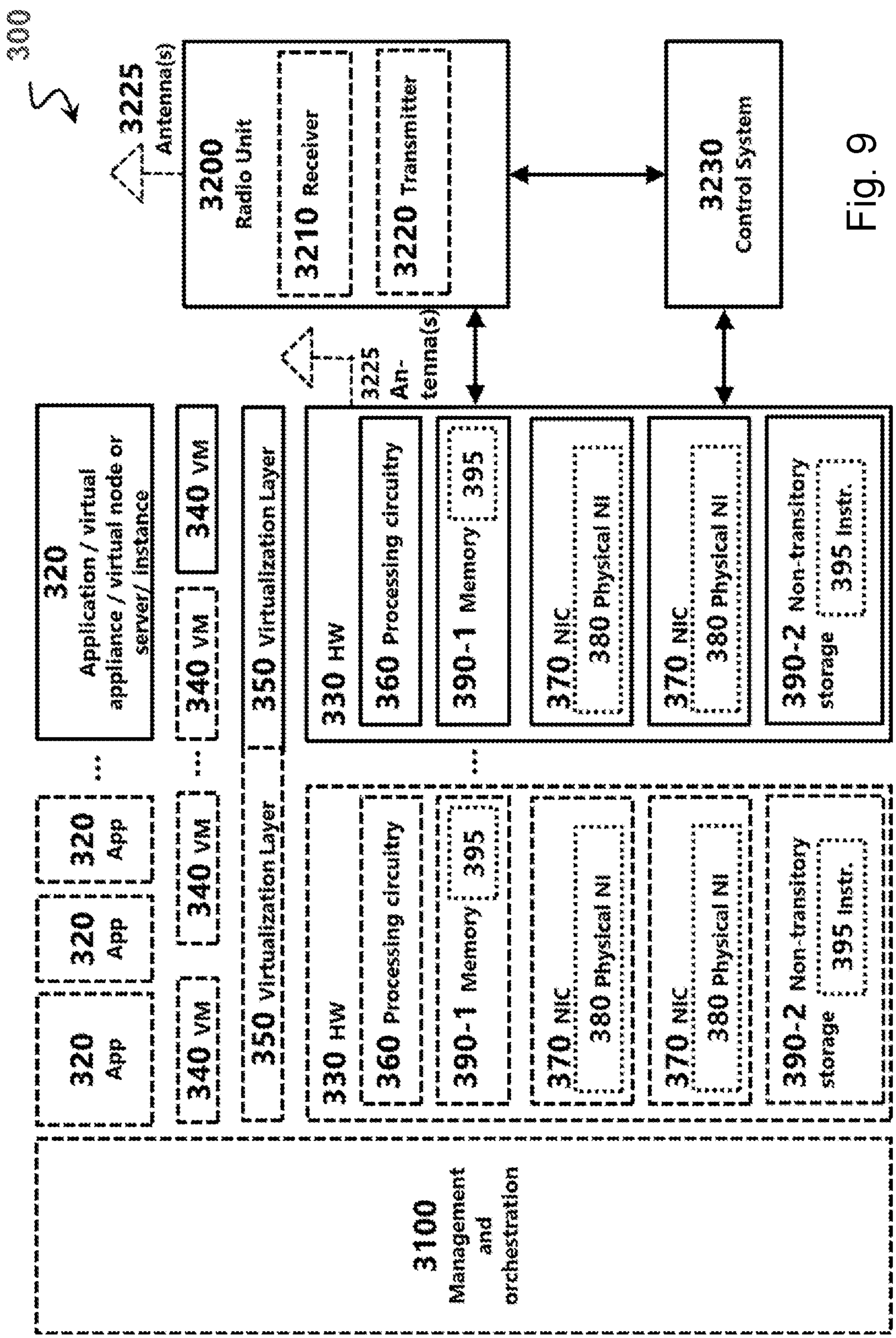
FIG. 9 illustrates an example virtualization environment, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 10:
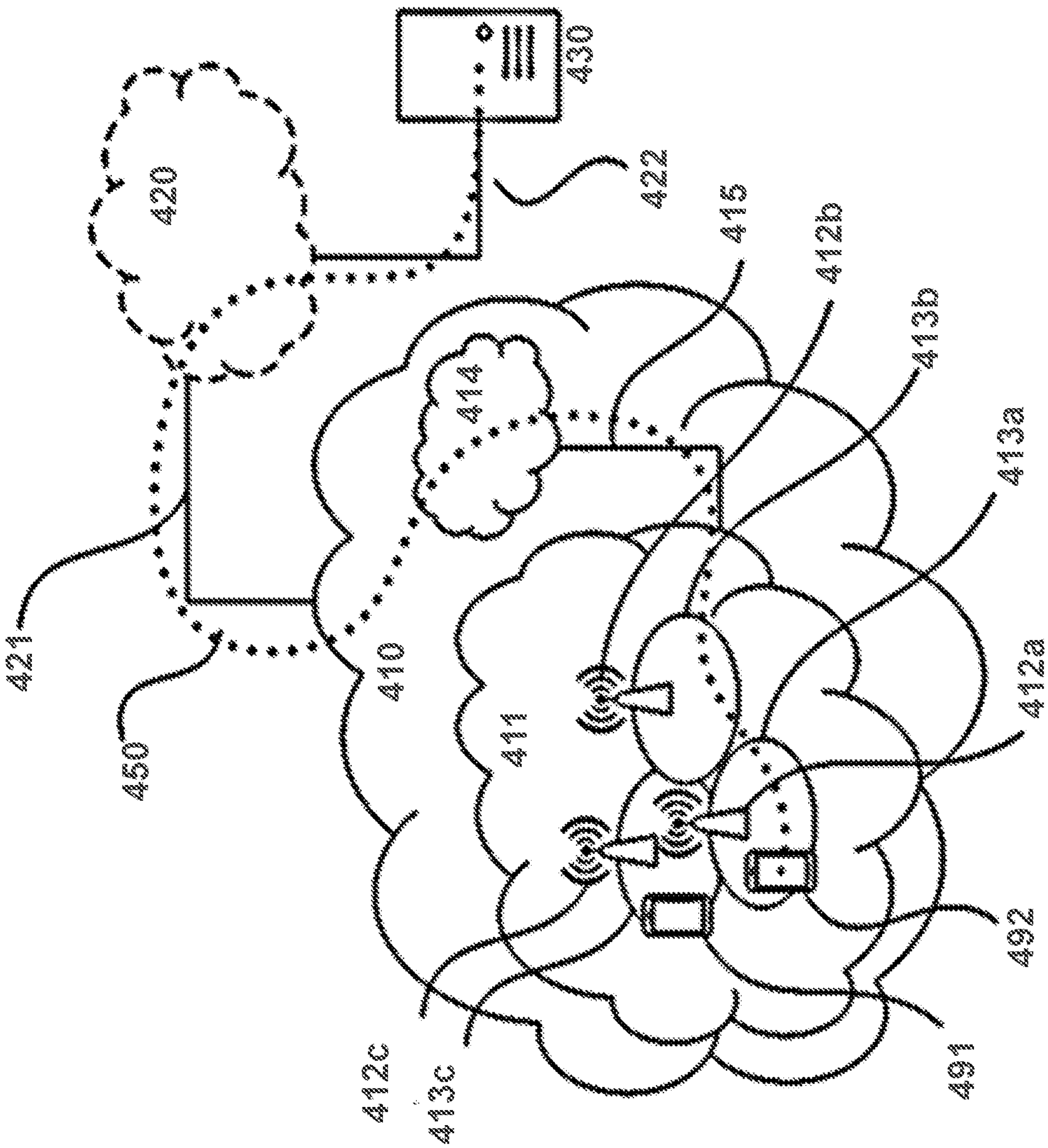
FIG. 10 illustrates an example telecommunication network connected via an intermediate network to a host computer, according to certain embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415.

A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
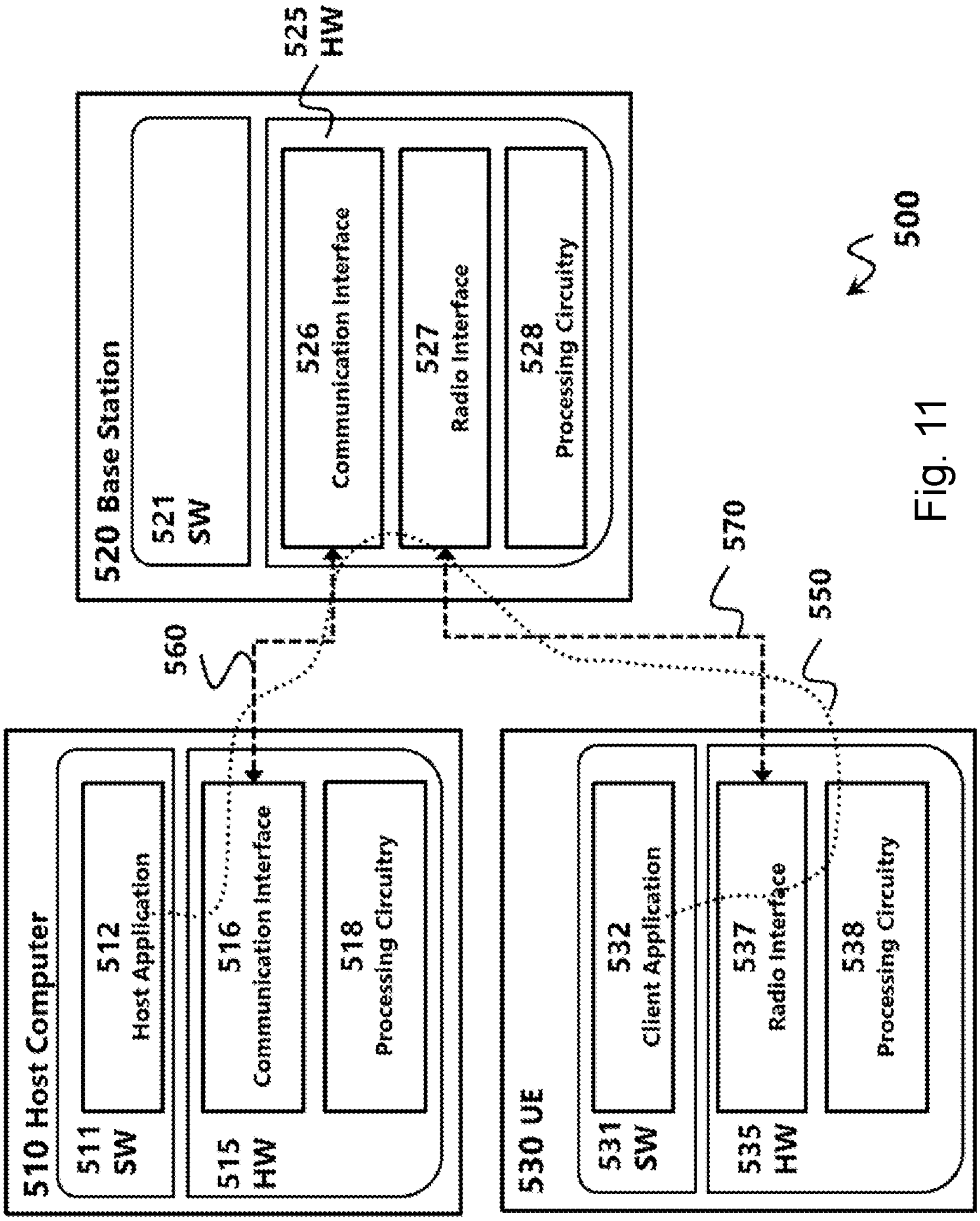
FIG. 11 illustrates an example host computer communicating via a base station with a user equipment over a partially wireless connection, according to certain embodiments.

FIG. 11 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct, or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 9, respectively. This is to say, the inner workings of these entities may be as shown in FIG. 11 and independently, the surrounding network topology may be that of FIG. 9.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
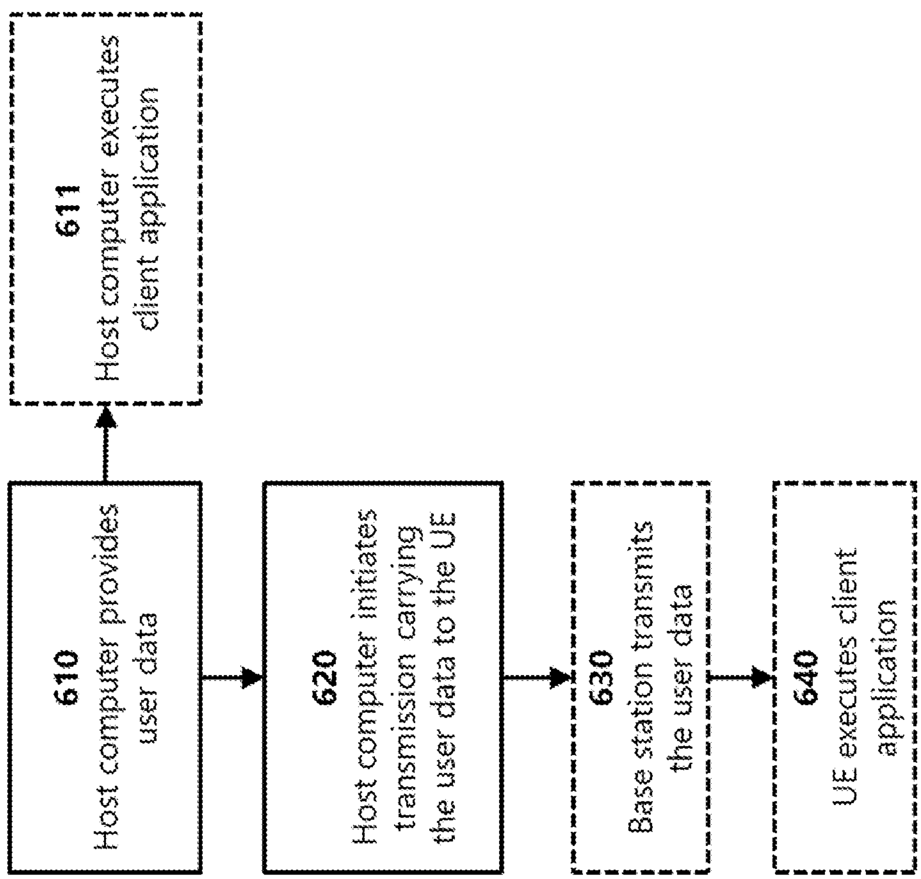
FIG. 12 is a flowchart illustrating a method implemented, according to certain embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
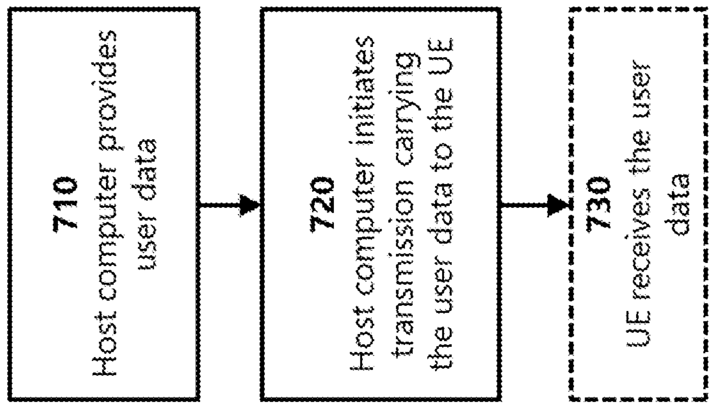
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
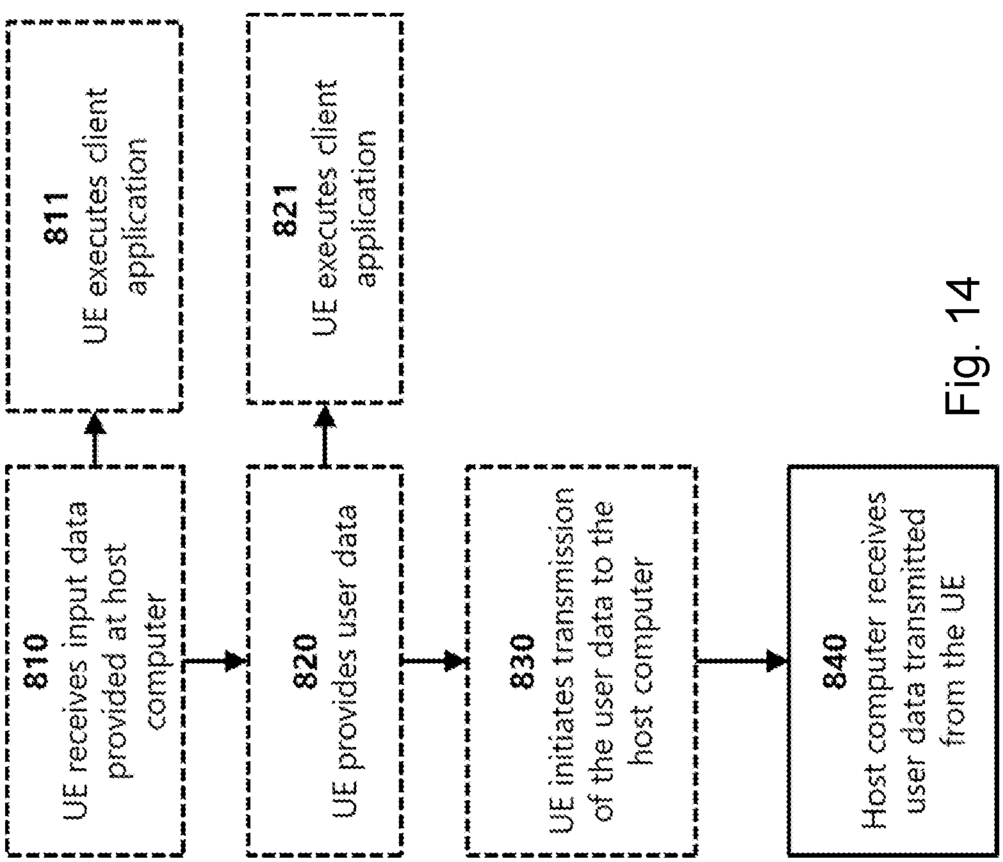
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
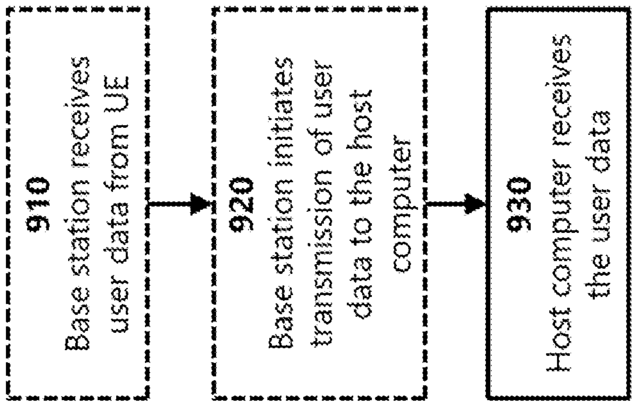
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Some example embodiments are described below.

1. A computer program product for a wireless device capable of operating with a first cell group and a second cell group, the computer program product comprising a non-transitory computer readable medium storing computer readable program code, the computer readable program code operable, when executed by processing circuitry to:
   - receive a command to transition the second cell group from a first mode of operation to a second mode of operation;
   - transition the second cell group into the second mode of operation;
   - modify at least one parameter that was used for performing RLM associated with the second cell group while the second cell group was in the first mode of operation; and
   - perform RLM according to the at least one modified parameter while the second cell group is in the second mode of operation.

2. The computer program product of embodiment 1, wherein the first mode of operation is a normal operating mode and the second mode of operation is a power saving mode, or the first mode of operation is a power saving mode and the second mode of operation is a normal operating mode.

3. The computer program product of embodiment 2, wherein the program code is operable to modify the at least one parameter by relaxing the at least one parameter for the power saving mode.

4. The computer program product of embodiments 1-3, wherein the first cell group is a master cell group (MCG) and the second cell group is a secondary cell group (SCG), or the first cell group is a SCG and the second cell group is a MCG.

5. The computer program product of embodiments 1-4, wherein the program code is operable to modify the at least one parameter based on a RLM configuration for the second cell group to be applied when the second cell group transitions to the second mode of operation.

6. The computer program product of embodiments 1-5, wherein the program code is operable to modify the at least one parameter by applying a delta value to a parameter used in the first mode of operation for use when the second cell group transitions to the second mode of operation.

7. The computer program product of embodiments 1-6, wherein the at least one parameter comprises a block error rate (BLER) associated with one or more of an in-synchronization (IS) threshold and an out-of-synchronization (OOS) threshold.

8. The computer program product of embodiments 1-6, wherein the at least one parameter comprises a physical downlink control channel (PDCCH) transmission parameter for one or more of in-synchronization (IS) evaluation and out-of-synchronization (OOS) evaluation.

9. The computer program product of embodiments 1-6, wherein the at least one parameter comprises an evaluation duration for one or more of in-synchronization (IS) evaluation and out-of-synchronization (OOS) evaluation.

10. The computer program product of embodiments 1-6, wherein the at least one parameter comprises a reference signal type, and wherein the reference signal type is at least one of a channel state information reference signal (CSI-RS) and a synchronization signal block (SSB).

11. The computer program product of embodiments 1-6, wherein the at least one parameter comprises a beam configuration, wherein the beam configuration comprises at least one of a narrow beam configuration and a wide beam configuration.

12. The computer program product of embodiments 1-6, wherein the at least one parameter comprises a maximum number of reference signals used for RLM.

13. The computer program product of embodiments 1-6, wherein the at least one parameter comprises a measurement gap.

14. The computer program product of embodiments 1-6, wherein the at least one parameter comprises a timer associated with determining radio link failure (RLF).

15. The computer program product of embodiments 1-6, wherein the at least one parameter comprises a periodicity of a reference signal.

16. A wireless device comprises a receiving module, a determining module and a monitoring module:

the receiving module is operable to receive a command to transition the second cell group from a first mode of operation to a second mode of operation;

the determining module is operable to:

transition the second cell group into the second mode of operation;

modify at least one parameter that was used for performing RLM associated with the second cell group while the second cell group was in the first mode of operation; and the monitoring module is operable to perform RLM according to the at least one modified parameter while the second cell group is in the second mode of operation.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ACK/NACK Acknowledgment/Non-acknowledgment
BCCH Broadcast Control Channel
BCH Broadcast Channel
CA Carrier Aggregation
CBRA Contention-Based Random Access
CC Carrier Component
CDMA Code Division Multiplexing Access
CFRA Contention-Free Random Access
CG Configured Grant
CGI Cell Global Identifier
CP Cyclic Prefix
CQI Channel Quality information
C-RNTI Cell RNTI
CSI Channel State Information
DCCH Dedicated Control Channel
DCI Downlink Control Information
DFTS-OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HO Handover
HSPA High Speed Packet Access
HRPD High Rate Packet Data
IAB Integrated Access and Backhaul
LOS Line of Sight
LTE Long-Term Evolution
MAC Medium Access Control
MCS Modulation and Coding Scheme
MDT Minimization of Drive Tests
MIB Master Information Block
MME Mobility Management Entity
MSC Mobile Switching Center
NPDCCH Narrowband Physical Downlink Control Channel
NR New Radio
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PDCCH Physical Downlink Control Channel
PDSCH Physical Downlink Shared Channel
PGW Packet Gateway
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUR Preconfigured Uplink Resources
PUSCH Physical Uplink Shared Channel
RACH Random Access Channel
QAM Quadrature Amplitude Modulation
RA Random Access
RAN Radio Access Network
RAT Radio Access Technology
RLF Radio Link Failure
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SPS Semi-Persistent Scheduling
SUL Supplemental Uplink
SS Synchronization Signal
SSB Synchronization Signal Block
SSS Secondary Synchronization Signal
TA Timing Advance
TDD Time Division Duplex
TDOA Time Difference of Arrival
TO Transmission Occasion
TOA Time of Arrival
TSS Tertiary Synchronization Signal
TTI Transmission Time Interval
UE User Equipment
UL Uplink
URLLC Ultra-Reliable and Low-Latency Communications
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for power saving, the wireless device operating in dual connectivity with a first cell group and a second cell group, the second cell group comprising a plurality of cells, wherein one cell of the plurality of cells comprises a special cell, the method comprising:

receiving a command to transition the second cell group from a first mode of operation to a second mode of operation;

transitioning the second cell group into the second mode of operation, comprising transitioning the plurality of cells including the special cell into the second mode of operation;

modifying at least one parameter that was used for performing radio link monitoring (RLM) associated with the second cell group while the second cell group was in the first mode of operation; and performing RLM according to the at least one modified parameter while the second cell group is in the second mode of operation, wherein performing the RLM comprises performing the RLM for the plurality of cells including the special cell;

wherein the first cell group is a master cell group (MCG) and the second cell group is a secondary cell group (SCG), or the first cell group is the SCG and the second cell group is the MCG.

2. The method of claim 1, wherein the first mode of operation is a normal operating mode and the second mode of operation is a power saving mode, or the first mode of operation is the power saving mode and the second mode of operation is the normal operating mode.

3. The method of claim 2, wherein modifying the at least one parameter comprises relaxing the at least one parameter for the power saving mode.

4. The method of claim 1, wherein modifying the at least one parameter is based on a RLM configuration for the second cell group to be applied when the second cell group transitions to the second mode of operation.

5. The method of claim 1, wherein modifying the at least one parameter comprises applying a delta value to a parameter used in the first mode of operation for use when the second cell group transitions to the second mode of operation.

6. The method of claim 1, wherein the at least one parameter comprises a block error rate (BLER) associated with one or more of an in-synchronization (IS) threshold and an out-of-synchronization (OOS) threshold.

7. A wireless device capable of operating in dual connectivity with a first cell group and a second cell group, the second cell group comprising a plurality of cells, wherein one cell of the plurality of cells comprises a special cell, the wireless device comprising:

processing circuitry operable to:

receive a command to transition the second cell group from a first mode of operation to a second mode of operation;

transition the second cell group into the second mode of operation, comprising transitioning the plurality of cells including the special cell into the second mode of operation;

modify at least one parameter that was used for performing radio link monitoring (RLM) associated with the second cell group while the second cell group was in the first mode of operation; and perform RLM according to the at least one modified parameter while the second cell group is in the second mode of operation, wherein the processing circuitry performs the RLM by performing the RLM for the plurality of cells including the special cell;

wherein the first cell group is a master cell group (MCG) and the second cell group is a secondary cell group (SCG), or the first cell group is the SCG and the second cell group is the MCG.

8. The wireless device of claim 7, wherein the first mode of operation is a normal operating mode and the second mode of operation is a power saving mode, or the first mode of operation is the power saving mode and the second mode of operation is the normal operating mode.

9. The wireless device of claim 8, wherein the processing circuitry is operable to modify the at least one parameter by relaxing the at least one parameter for the power saving mode.

10. The wireless device of claim 7, wherein the processing circuitry is operable to modify the at least one parameter based on a RLM configuration for the second cell group to be applied when the second cell group transitions to the second mode of operation.

11. The wireless device of claim 7, wherein the processing circuitry is operable to modify the at least one parameter by applying a delta value to a parameter used in the first mode of operation for use when the second cell group transitions to the second mode of operation.

12. The wireless device of claim 7, wherein the at least one parameter comprises a block error rate (BLER) associated with one or more of an in-synchronization (IS) threshold and an out-of-synchronization (OOS) threshold.

13. The wireless device of claim 7, wherein the at least one parameter comprises a physical downlink control channel (PDCCH) transmission parameter for one or more of in-synchronization (IS) evaluation and out-of-synchronization (OOS) evaluation.

14. The wireless device of claim 7, wherein the at least one parameter comprises an evaluation duration for one or more of in-synchronization (IS) evaluation and out-of-synchronization (OOS) evaluation.

15. The wireless device of claim 7, wherein the at least one parameter comprises a reference signal type, and wherein the reference signal type is at least one of a channel state information reference signal (CSI-RS) and a synchronization signal block (SSB).

16. The wireless device of claim 7, wherein the at least one parameter comprises a beam configuration, wherein the beam configuration comprises at least one of a narrow beam configuration and a wide beam configuration.

17. The wireless device of claim 7, wherein the at least one parameter comprises a maximum number of reference signals used for RLM.

18. The wireless device of claim 7, wherein the at least one parameter comprises a measurement gap.

19. The wireless device of claim 7, wherein the at least one parameter comprises a timer associated with determining radio link failure (RLF).

20. The wireless device of claim 7, wherein the at least one parameter comprises a periodicity of a reference signal.

21. A method performed by a network node, the method comprising:

determining a first radio link monitoring (RLM) configuration and a second RLM configuration for a wireless device capable of operating in dual connectivity with a first cell group and a second cell group, the second cell group comprising a plurality of cells, wherein one cell of the plurality of cells comprises a special cell, wherein first RLM configuration is for use when the second cell group is in an activated mode of operation and the second RLM configuration is for use when the second cell group is in a deactivated mode of operation, wherein the RLM configuration applies to the plurality of cells including the special cell, wherein the first cell group is a master cell group (MCG) and the second cell group is a secondary cell group (SCG), or the first cell group is a SCG and the second cell group is a MCG; and transmitting the first and second RLM configurations to the wireless device.

22. The method of claim 21, wherein the second RLM configuration comprises a delta value to apply to the first RLM configuration.

23. A network node:

the network node comprising processing circuitry operable to:

determine a first radio link monitoring (RLM) configuration and a second RLM configuration for a wireless device capable of operating in dual connectivity with a first cell group and a second cell group, the second cell group comprising a plurality of cells, wherein one cell of the plurality of cells comprises a special cell, wherein first RLM configuration is for use when the second cell group is in an activated mode of operation and the second RLM configuration is for use when the second cell group is in a deactivated mode of operation, wherein the RLM configuration applies to the plurality of cells including the special cell, wherein the first cell group is a master cell group (MCG) and the second cell group is a secondary cell group (SCG), or the first cell group is a SCG and the second cell group is a MCG; and transmit the first and second RLM configurations to the wireless device.

24. The network node of claim 23, wherein the second RLM configuration comprises a delta value to apply to the first RLM configuration.

* * * * *